(12) United States Patent
Xiao

(10) Patent No.: US 9,323,487 B2
(45) Date of Patent: Apr. 26, 2016

(54) PROVIDING AN INTEGRATED, FEATURE ORIENTED AD-HOC PRINTING DEVICE SELECTION SYSTEM FOR MOBILE CLIENT DEVICES

(71) Applicant: Zhenning Xiao, Renton, WA (US)

(72) Inventor: Zhenning Xiao, Renton, WA (US)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 14/154,943

(22) Filed: Jan. 14, 2014

(65) Prior Publication Data

US 2015/0199157 A1    Jul. 16, 2015

(51) Int. Cl.
| | |
|---|---|
| *G06F 3/12* | (2006.01) |
| *G06F 21/31* | (2013.01) |
| *G06K 15/02* | (2006.01) |
| *H04W 84/18* | (2009.01) |
| *H04W 4/00* | (2009.01) |

(52) U.S. Cl.
CPC ............ *G06F 3/1236* (2013.01); *G06F 3/1203* (2013.01); *G06F 3/126* (2013.01); *G06F 3/1238* (2013.01); *G06F 3/1292* (2013.01); *H04W 4/008* (2013.01); *H04W 84/18* (2013.01)

(58) Field of Classification Search
CPC .................................................... G06F 3/1289
See application file for complete search history.

(56) References Cited

U.S. PATENT DOCUMENTS

| | | |
|---|---|---|
| 5,580,177 A | 12/1996 | Gase et al. |
| 6,003,069 A | 12/1999 | Cavill |
| 6,094,548 A | 7/2000 | Gunning et al. |
| 6,369,909 B1 | 4/2002 | Shima |
| 6,529,286 B1 | 3/2003 | King |
| 6,825,941 B1 | 11/2004 | Nguyen et al. |
| 6,920,506 B2 | 7/2005 | Barnard et al. |
| 7,768,664 B2 | 8/2010 | Asano |

(Continued)

FOREIGN PATENT DOCUMENTS

| | | |
|---|---|---|
| EP | 0656581 EP | 6/1995 |
| EP | 0893753 | 1/1999 |

(Continued)

OTHER PUBLICATIONS

U.S. Appl. No. 11/830,129, filed Jul. 30, 2007, Final Office Action, Jan. 13, 2011.
U.S. Appl. No. 11/830,129, filed Jul. 30, 2007, Office Action, Dec. 11, 2012.
U.S. Appl. No. 11/830,129, filed Jul. 30, 2007, Notice of Allowance, Apr. 29, 2013.

(Continued)

*Primary Examiner* — Beniyam Menberu
(74) *Attorney, Agent, or Firm* — Hickman Palermo Becker Bingham LLP; Edward A. Becker

(57) ABSTRACT

An integrated printer driver includes the capability to discover available ad-hoc printing devices and obtain the features and options currently supported by those ad-hoc printing devices. The integrated printer driver automatically selects a particular ad-hoc printing device based upon a user's selected feature and option set and allows a user to print an electronic document prior to an ad-hoc communications link being established with the particular ad-hoc printing device. The integrated printer driver generates an un-rendered print job and holds the un-rendered print job until an ad-hoc communications link is established with the particular ad-hoc printing device. After the ad-hoc communications link has been established, the integrated printer driver determines whether the particular ad-hoc printing device is capable of successfully processing the un-rendered print job and if so, causes the un-rendered print job to be transmitted to a print rendering server for rendering.

16 Claims, 27 Drawing Sheets

(56) References Cited

U.S. PATENT DOCUMENTS

| | | | |
|---|---|---|---|
| 8,503,933 B2 | 8/2013 | Moritomo et al. | |
| 8,789,144 B2 | 7/2014 | Mazzaferri et al. | |
| 2002/0051204 A1 | 5/2002 | Ohara | |
| 2002/0054345 A1* | 5/2002 | Tomida et al. | 358/1.15 |
| 2002/0065101 A1* | 5/2002 | Picoult | H04N 1/00315 |
| | | | 455/556.2 |
| 2002/0103853 A1 | 8/2002 | Copp et al. | |
| 2002/0120742 A1 | 8/2002 | Cherry | |
| 2002/0135798 A1 | 9/2002 | Simpson et al. | |
| 2003/0090694 A1 | 5/2003 | Kennedy et al. | |
| 2003/0103235 A1 | 6/2003 | Gomi | |
| 2003/0231328 A1 | 12/2003 | Chapin et al. | |
| 2004/0061890 A1 | 4/2004 | Ferlitsch | |
| 2004/0070779 A1 | 4/2004 | Ferlitsch | |
| 2004/0125956 A1 | 7/2004 | Heiderscheit et al. | |
| 2004/0160623 A1* | 8/2004 | Strittmatter et al. | 358/1.15 |
| 2004/0172586 A1* | 9/2004 | Ragnet et al. | 715/500 |
| 2005/0117948 A1 | 6/2005 | Hatta et al. | |
| 2005/0138065 A1 | 6/2005 | Ciriza | |
| 2005/0220099 A1* | 10/2005 | Igarashi | 370/389 |
| 2007/0030516 A1* | 2/2007 | Tsuji et al. | 358/1.15 |
| 2007/0124436 A1* | 5/2007 | Shepherd | 709/223 |
| 2007/0133044 A1 | 6/2007 | Tanaka | |
| 2007/0233834 A1 | 10/2007 | Hattori et al. | |
| 2008/0091700 A1 | 4/2008 | Brotherson | |
| 2010/0188680 A1 | 7/2010 | Xiao | |
| 2010/0188688 A1 | 7/2010 | Selvaraj et al. | |
| 2011/0149314 A1* | 6/2011 | Kim | 358/1.9 |
| 2011/0242564 A1 | 10/2011 | Armstrong et al. | |
| 2012/0026536 A1* | 2/2012 | Shah | 358/1.15 |
| 2012/0218576 A1* | 8/2012 | Sekine et al. | 358/1.13 |
| 2013/0141746 A1 | 6/2013 | Miller et al. | |
| 2013/0201517 A1 | 8/2013 | Blanchard et al. | |
| 2015/0062621 A1* | 3/2015 | Xiao | G06F 3/1203 |
| | | | 358/1.15 |
| 2016/0042192 A1 | 2/2016 | Motoyama | |

FOREIGN PATENT DOCUMENTS

| | | |
|---|---|---|
| EP | 1 178 392 | 2/2002 |
| JP | 9006557 A | 1/1997 |
| JP | 2001142665 A | 5/2001 |
| JP | 2001282492 A | 10/2001 |
| JP | 2003330638 A | 11/2003 |
| JP | 2005071175 A | 3/2005 |
| JP | 2005228243 A | 8/2005 |
| JP | 2006-092373 | 4/2006 |
| JP | 2007-172469 | 7/2007 |
| WO | WO 00/68817 | 11/2000 |
| WO | WO 01/31432 | 5/2001 |

OTHER PUBLICATIONS

U.S. Appl. No. 13/333,454, filed Dec. 21, 2011, Office Action, Sep. 4, 2013.

U.S. Appl. No. 13/333,454, filed Dec. 21, 2011, Final Office Action, Dec. 18, 2013.

U.S. Appl. No. 11/830,129, filed Jul. 30, 2007, Office Action Sep. 14, 2011.

U.S. Appl. No. 11/830,129, filed Jul. 30, 2007, Advisory Action, Feb. 9, 2012.

Cohen, Y., "SNMP—Simple Network Management Protocol," retrieved from website <http://www2.rad.com/networks/1995/snmp/snmp.htm >, printed on May 18, 2007 (8 pages).

European Patent Office, "European Search Report," Foreign application No. 08150551.3/1245, dated Aug. 28, 2008 (7 pages).

Claims, Foreign application No. 08150551.3/1245 dated Aug. 2008 (5 pages).

European Patent Office, "European Search Report," Foreign application No. 08150570.3/1245, dated Nov. 4, 2008 (8 pages).

Microsoft, "AsyncUI Notifications," 2005 Microsoft Corporation, retrieved on website <http://www.microsoft.com/whdc/device/print/AsyncUI.mspx >, written May 9, 2006 (11 pages).

European Search Report received in EPP99309 dated Nov. 29, 2010 (9 pages).

Simple Service Discovery Protocol. Wikipedia, the free encyclopedia. [retrieved on Sep. 11, 2008]. pp. 1. Retrieved from the Internet: <URL: http://en.wikipedia.org/wiki/Simple_Service_Discovery_Protocol>.

Beatty, J., et. al, Web Services Dynamic Discovery. Published by Microsoft Corporation [online], Apr. 2005 [retrieved on Sep. 11, 2008]. pp. 1-42. Retrieved from the Internet: <URL: http://specs.xmlsoap.org/ws/2005/04/discovery/ws-discovery.pdf>.

Goland, Y., et. al, Simple Service Discovery Protocol/1.0, Operating without an Arbiter (SSDP). Published by Internet Engineering Task Force [online], Oct. 1999 [retrieved on Sep. 11, 2008]. pp. 1-18. Retrieved from the Internet: <URL:http://ietfreport.isoc.org/all-ids/draft-cai-ssdp-v1-03.txt>. Redmond, Washington, USA.

European Office Action received in Application No. 08 252 541.1—1245 dated May 16, 2012 (9 pages).

U.S. Appl. No. 14/011,978, filed Aug. 28, 2013, Office Action, Oct. 22, 2014.

European Patent Office, "Search Report" in application No. 14180845.1-1959, dated Jan. 8, 2015, 7 pages.

U.S. Appl. No. 14/011,978, filed Aug. 28, 2013, Notice of Allowance, Mar. 30, 2015.

U.S. Appl. No. 14/011,978, filed Aug. 8, 2013, Final Office Action, Jan. 8, 2015.

U.S. Appl. No. 13/037,252, filed Feb. 28, 2011, Office Action, Dec. 16, 2014.

* cited by examiner

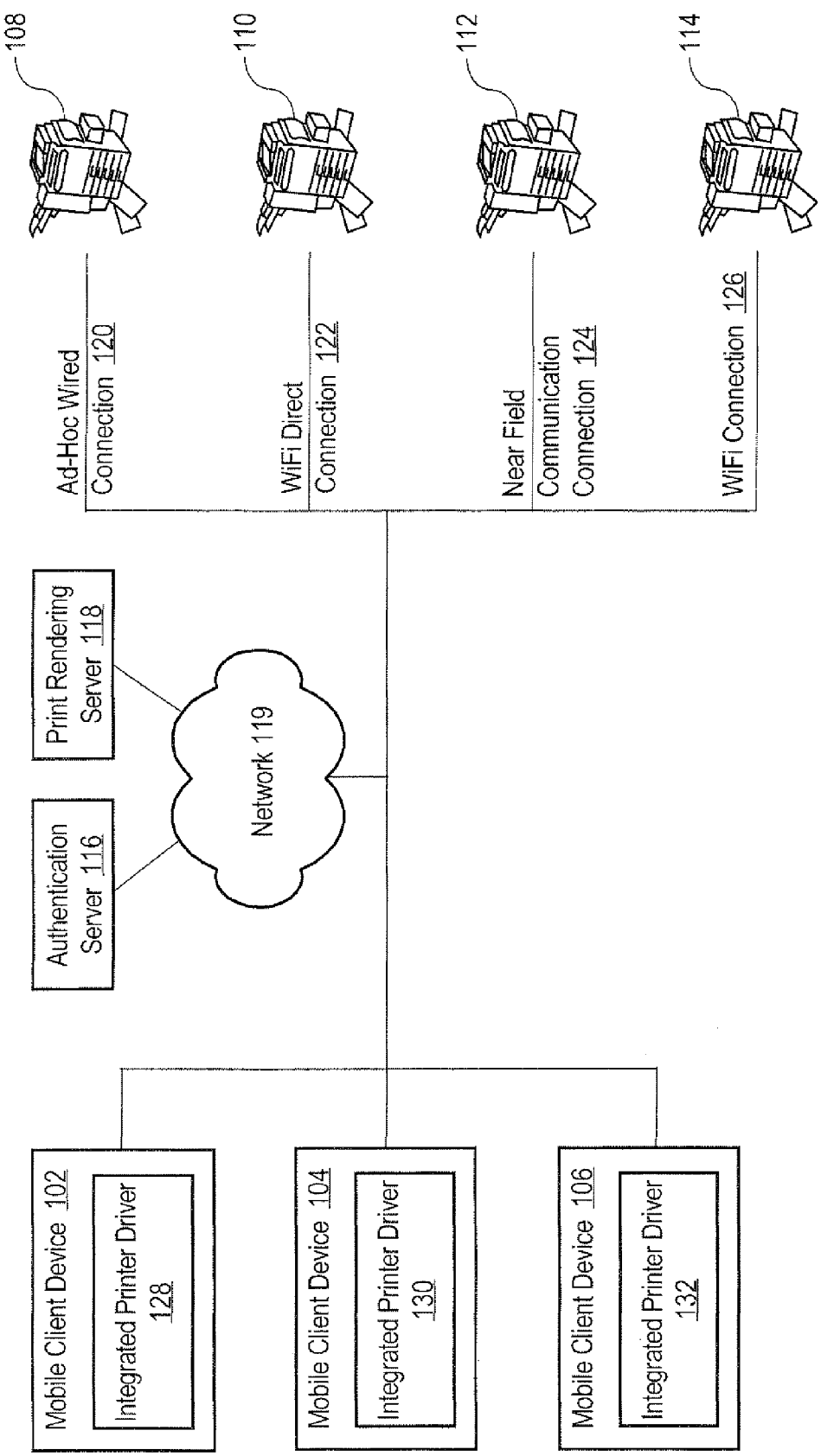

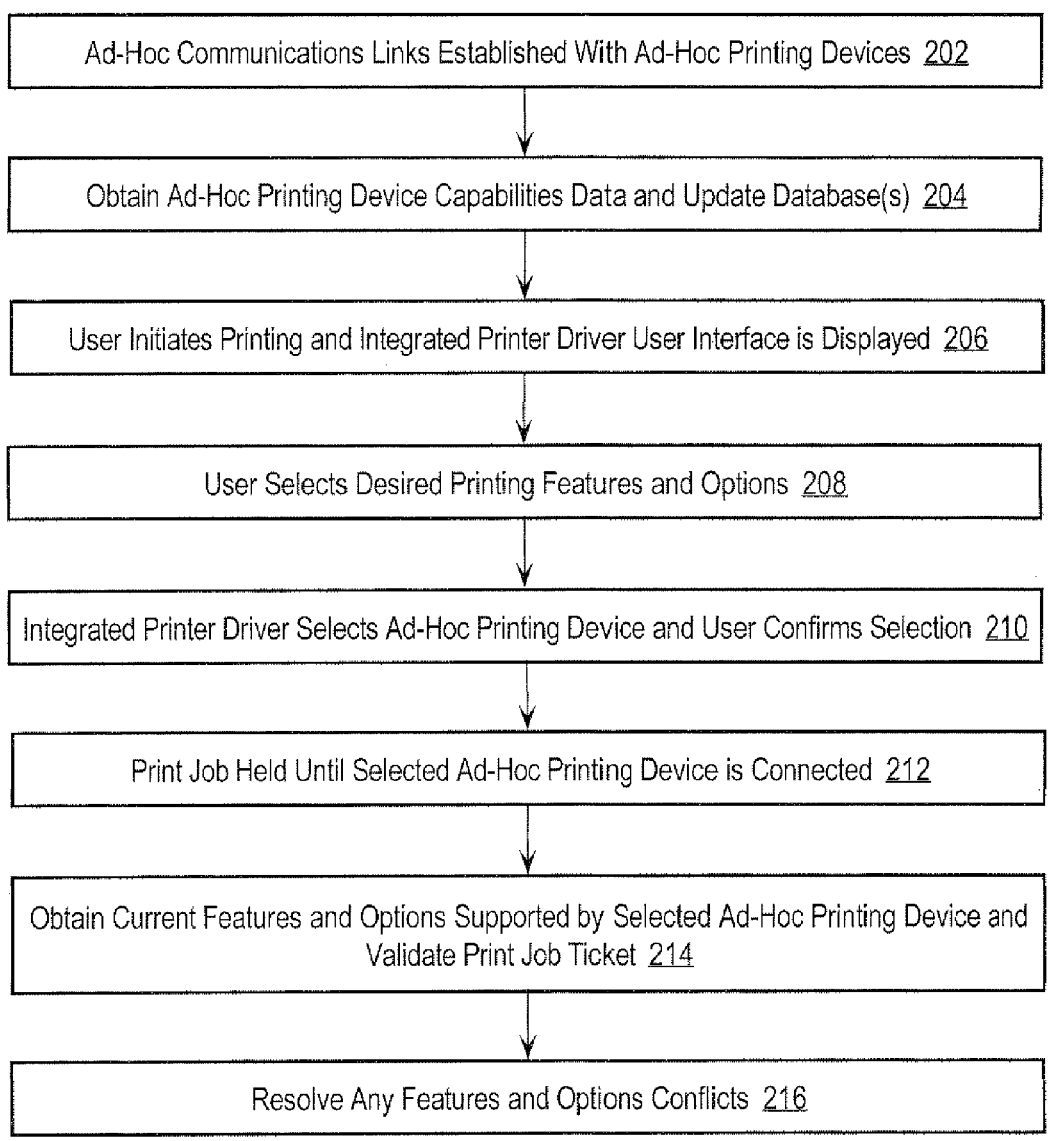

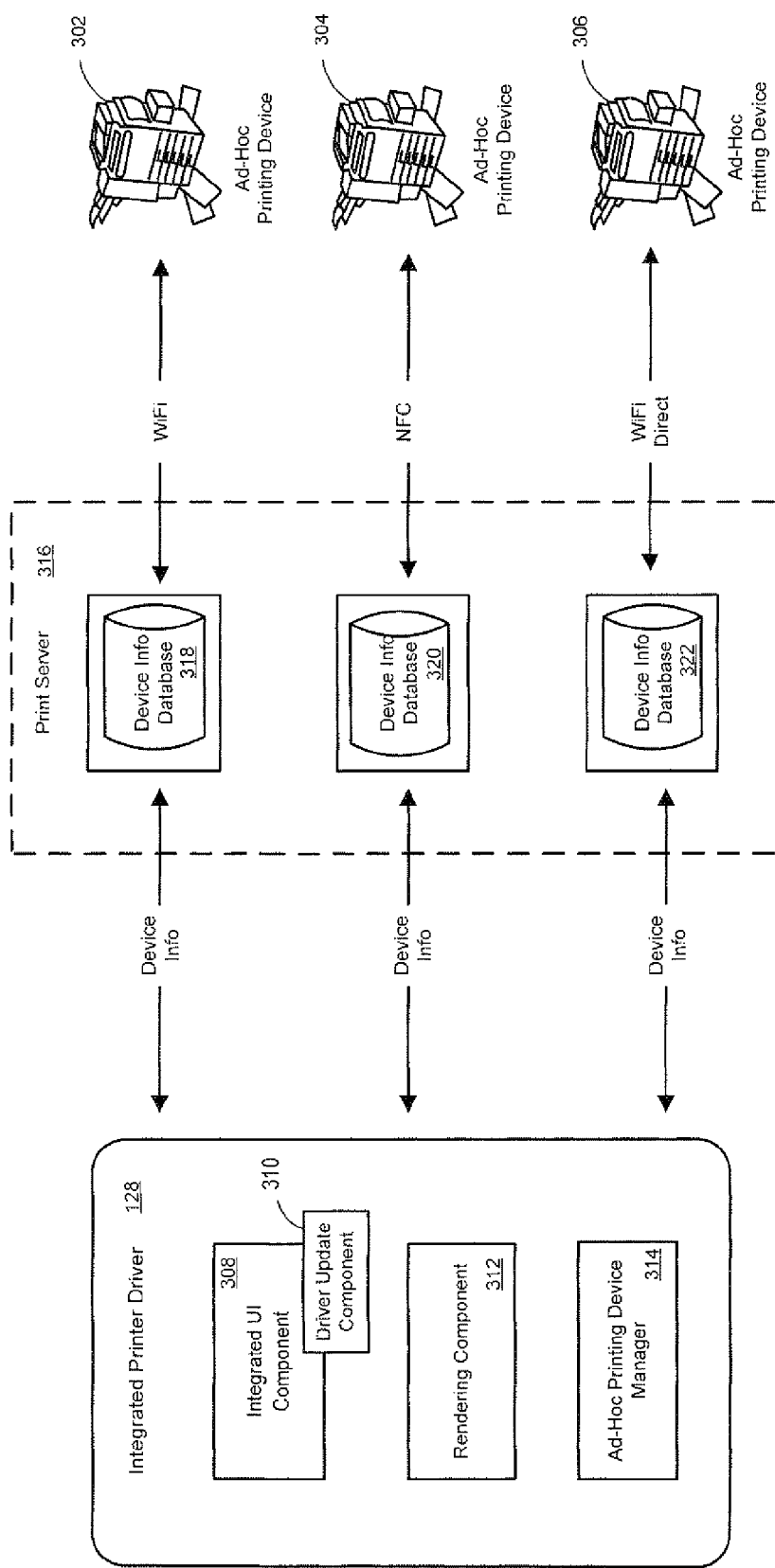

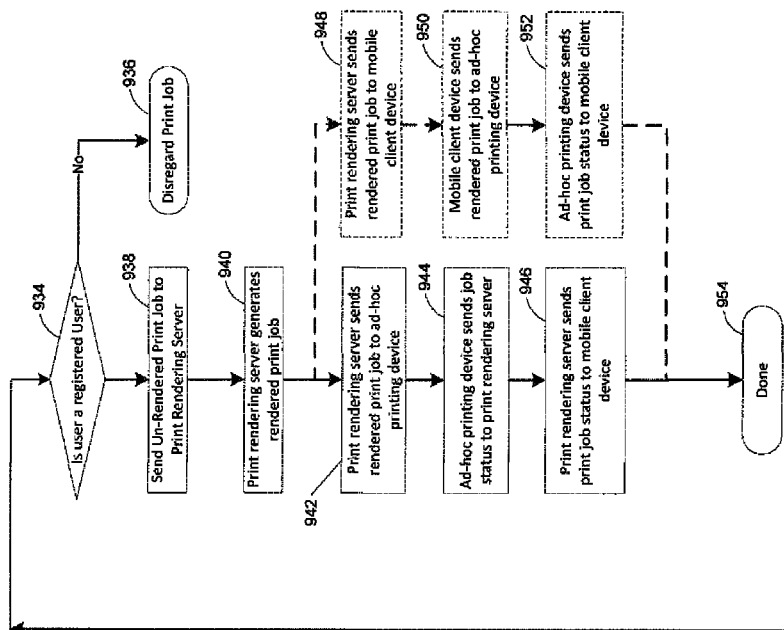
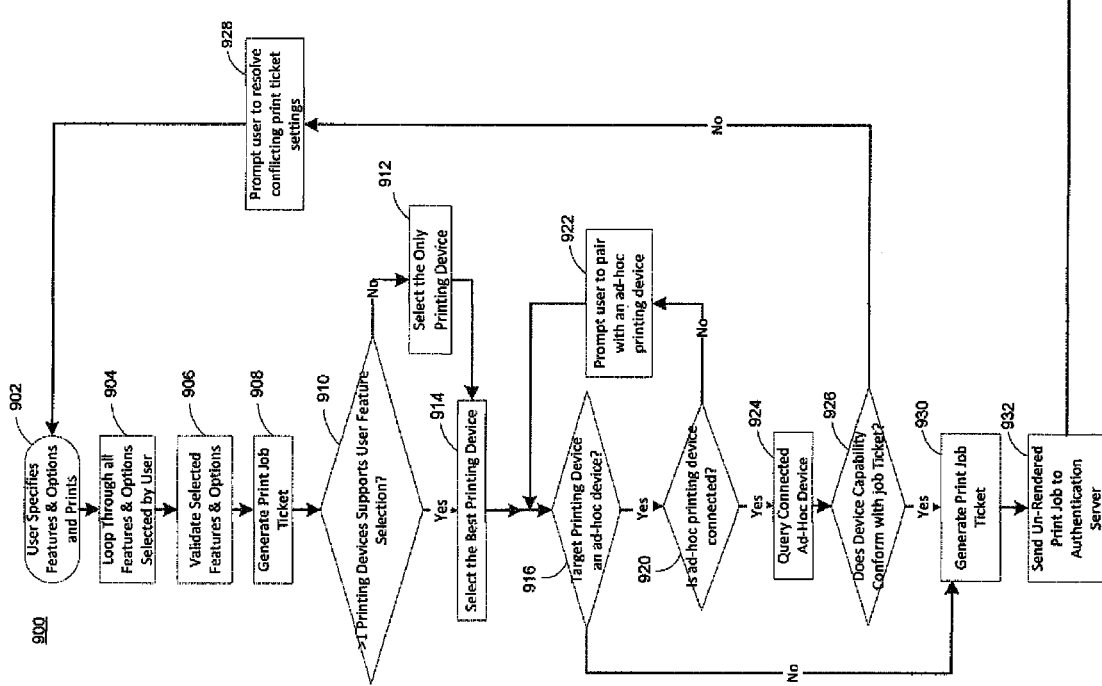
FIG. 9

FIG. 13

Server GPDD 1310

```xml
<GPDD Value="Server Level">
<DeviceList>
<Device>
  <DeviceID Value="0003"/>
  <DeviceName Value="Ricoh MP C3300"/>
  <DeviceBuilding Value="Building 1"/>
  <DeviceFloor Value="Floor 1"/>
  <DeviceDomainName Value="Companyxxx"/>
  <DeviceConnectType Value="Wired Network"/>
  <DeviceWiredType Value="Wired"/>
  <DeviceType Value="Laser"/>
  <DeviceColor Value="Color"/>
  <DeviceSpeed Value="Low"/>
  <AdHocDevice Value="True"/>
  <DeviceFeature Value="Sides">
    <DisplayName xml:lang="en-US">Print on Both Sides</DisplayName>
    <FeatureOption Value="OneSided">
      <DisplayName xml:lang="en-US">None</DisplayName>
    </FeatureOption>
    <FeatureOption Value="TwoSidedLongEdge">
      <DisplayName xml:lang="en-US">Flip on long edge</DisplayName>
    </FeatureOption>
    <FeatureOption Value="TwoSidedShortEdge">
      <DisplayName xml:lang="en-US">Flip on short edge</DisplayName>
    </FeatureOption>
  </DeviceFeature>
</Device>
</DeviceList>
</GPDD>
```

Driver GPDD 1320

```xml
<GPDD Value="Driver Level">
<DeviceList>
<Device>
  <DeviceID Value="0003"/>
  <DeviceName Value="Ricoh MP C3300"/>
  <DeviceBuilding Value="Building 1"/>
  <DeviceFloor Value="Floor 1"/>
  <DeviceDomainName Value="Companyxxx"/>
  <DeviceConnectType Value="Wired Network"/>
  <DeviceWiredType Value="Wired"/>
  <DeviceType Value="Laser"/>
  <DeviceColor Value="Color"/>
  <DeviceSpeed Value="Low"/>
  <AdHocDevice Value="True"/>
  <DeviceFeature Value="Sides">
    <DisplayName xml:lang="en-US">Print on Both Sides</DisplayName>
    <FeatureOption Value="OneSided">
      <DisplayName xml:lang="en-US">None</DisplayName>
    </FeatureOption>
    <FeatureOption Value="TwoSidedLongEdge">
      <DisplayName xml:lang="en-US">Flip on long edge</DisplayName>
    </FeatureOption>
    <FeatureOption Value="TwoSidedShortEdge">
      <DisplayName xml:lang="en-US">Flip on short edge</DisplayName>
    </FeatureOption>
  </DeviceFeature>
</Device>
</DeviceList>
</GPDD>
```

UI GPDD 1330

```xml
<GPDD Value="UI Level">
<User Name="user">
<DeviceList>
<Device>
  <DeviceID Value="0003"/>
  <DeviceName Value="Ricoh MP C3300"/>
  <DeviceBuilding Value="Building 1"/>
  <DeviceFloor Value="Floor 1"/>
  <DeviceDomainName Value="Companyxxx"/>
  <DeviceConnectType Value="Wired Network"/>
  <DeviceWiredType Value="Wired"/>
  <DeviceType Value="Laser"/>
  <DeviceColor Value="Color"/>
  <DeviceSpeed Value="Low"/>
  <AdHocDevice Value="True"/>
  <DeviceFeature Value="Sides">
    <DisplayName xml:lang="en-US">Print on Both Sides</DisplayName>
    <FeatureOption Value="OneSided">
      <DisplayName xml:lang="en-US">None</DisplayName>
    </FeatureOption>
    <FeatureOption Value="TwoSidedLongEdge">
      <DisplayName xml:lang="en-US">Flip on long edge</DisplayName>
    </FeatureOption>
    <FeatureOption Value="TwoSidedShortEdge">
      <DisplayName xml:lang="en-US">Flip on short edge</DisplayName>
    </FeatureOption>
  </DeviceFeature>
</Device>
</DeviceList>
</User>
</GPDD>
```

FIG. 18

PROVIDING AN INTEGRATED, FEATURE ORIENTED AD-HOC PRINTING DEVICE SELECTION SYSTEM FOR MOBILE CLIENT DEVICES

CROSS-REFERENCE TO RELATED APPLICATIONS

This application is related to U.S. patent application Ser. No. 11/830,129, filed Jul. 30, 2007, issued as U.S. Pat. No. 8,508,755 on Aug. 13, 2013 and U.S. patent application Ser. No. 13/333,454, filed Dec. 21, 2011, the entire contents of both which are hereby incorporated by reference for all purposes as if fully set forth herein.

FIELD OF THE INVENTION

The present invention relates to printing on ad-hoc printing device and, more particularly, to an approach for providing an integrated printer driver than can print to multiple ad-hoc printing devices.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A device driver or software driver is a computer program allowing higher-level computer programs to interact with a hardware device. In the printing context, a printer driver allows applications (e.g., Microsoft Word, Adobe Acrobat, SmartDraw, etc.) to print to a printing device without the applications being required to know the technical details of the printing device. A printer driver converts application data, from an application, to a form specific to a particular printing device.

Current printer drivers are printer specific, requiring that a separate printer driver be manually installed, on each client device, for each printing device that a user wishes to print to. The user must know the exact printer model and then download a printer driver from the manufacture for that exact model. In addition, most printer drivers do not have dynamic feature support and therefore must be updated if any changes are made to the printing devices. Some universal printer drivers exit that provide limited dynamic feature support by defining a limited set of features and then turning some features on or off through SNMP device querying. If a user moves their computing device (e.g., laptop) so that the computing devices is in a different network and the user desires to be able to print to printing devices in that different network, then the user must add more printer drivers to their computing device. As a result of installing numerous printer drivers, the user must retrieve all necessary printer information from every installed printer driver. Thus, creating a simple print job can quickly become a complicated job and result in an unfavorable user experience. Additionally, under current printer driver architectures, each printer driver displays its own user interface (UI). If user selects a different printing device, then an operating system must open a new printer driver with a different UI for that printing device.

Some current printer drivers are considered "universal" drivers in that such drivers support multiple models. However, one universal driver can only support one device at any given time. When multiple printing devices are present on one network, multiple instances of universal drivers must be installed into the operating system of a client device.

As a consequence of current printer driver architectures, if a user desires to use a printer feature (such as hole punching) and the user does not know which printing device supports that printer feature, then the user must open each printer driver's UI in order to determine which printing device is capable of that printer feature.

Some printing devices, referred to herein as "ad-hoc printing devices," now support ad-hoc wireless communications. Ad-hoc printing devices may be very convenient in many situations. For example, ad-hoc printing devices may be installed in locations such as shopping malls and coffee shops to allow users to print "on-the-go" from mobile computing devices, such as smart phones, tablet computers, laptop computers, personal digital assistants, etc. To print to an ad-hoc printing device, a user typically moves a mobile client device in close proximity to a particular ad-hoc printing device and establishes an ad-hoc communications link between the user's mobile client device and the particular ad-hoc printing device. After the ad-hoc communications link has been established, the user installs printer driver for this particular model, then the user prints and sends electronic document to the particular ad-hoc printing device.

Despite the conveniences provided by ad-hoc printing devices, there exist some drawbacks to using them. First, all of the issues described above with non-ad-hoc printing devices apply to ad-hoc printing devices. In addition, an ad-hoc communications link must be maintained until printing is completed. If a mobile client device is moved out of range of an ad-hoc printing device before a print job is completed, then the print job may abort with an error. When this occurs, the user must re-submit the entire print job to the ad-hoc printing device or locate another ad-hoc printing device. Another issue is that ad-hoc communications links are temporary and if a user wishes to print another electronic document to the same ad-hoc printing device after the ad-hoc communications link has been terminated, the user must first establish a new ad-hoc communications link to the ad-hoc printing device.

Another issue with ad-hoc printing is that it can be computationally expensive for mobile client devices that may have limited computing resources. For example, rendering large or complex electronic documents can consume a significant processing resources, storage resources and batter power.

SUMMARY

According to an approach for printing from mobile client devices to ad-hoc printing devices, prior to an ad-hoc wireless communications link being established between a mobile client device and a particular ad-hoc printing device, at the mobile client device an un-rendered print job is generated. After the ad-hoc wireless communications link is established between the mobile client device and the particular ad-hoc printing device, a determination, at the mobile client device, is made whether the un-rendered print job is compatible with the particular ad-hoc printing device. In response to determining, at the mobile client device, that the un-rendered print job is compatible with the particular ad-hoc printing device, then the un-rendered print job is transmitted to a print rendering server that is separate from the mobile client device for rendering. In response to determining, at the mobile client device, that the un-rendered print job is not compatible with the particular ad-hoc printing device, then at the mobile client device, an updated un-rendered print job is generated by resolving one or more incompatibilities between the print job and the particular ad-hoc printing device. The updated unrendered print job is transmitted to the print rendering server via the ad-hoc wireless communications link.

BRIEF DESCRIPTION OF THE DRAWINGS

In the drawings:

FIG. 1A is a block diagram that depicts an example ad-hoc printing device feature and option selection system.

FIGS. 2A & 2B are a flow diagram that depicts an example process for generating a print job.

FIG. 3 is a block diagram that depicts example components of an integrated printer driver and a print server and the interaction of those components with respect to ad-hoc printing devices.

FIG. 9 is a flow diagram that depicts a process for printing from a mobile client device to a printing device.

FIG. 13 is a block diagram that depicts example generic printer description data for each of a server, a driver, and a user interface.

FIG. 18 is a block diagram that depicts an example user interface that allows a user to select one or more features and options for a print job.

DETAILED DESCRIPTION

Figure 1B:
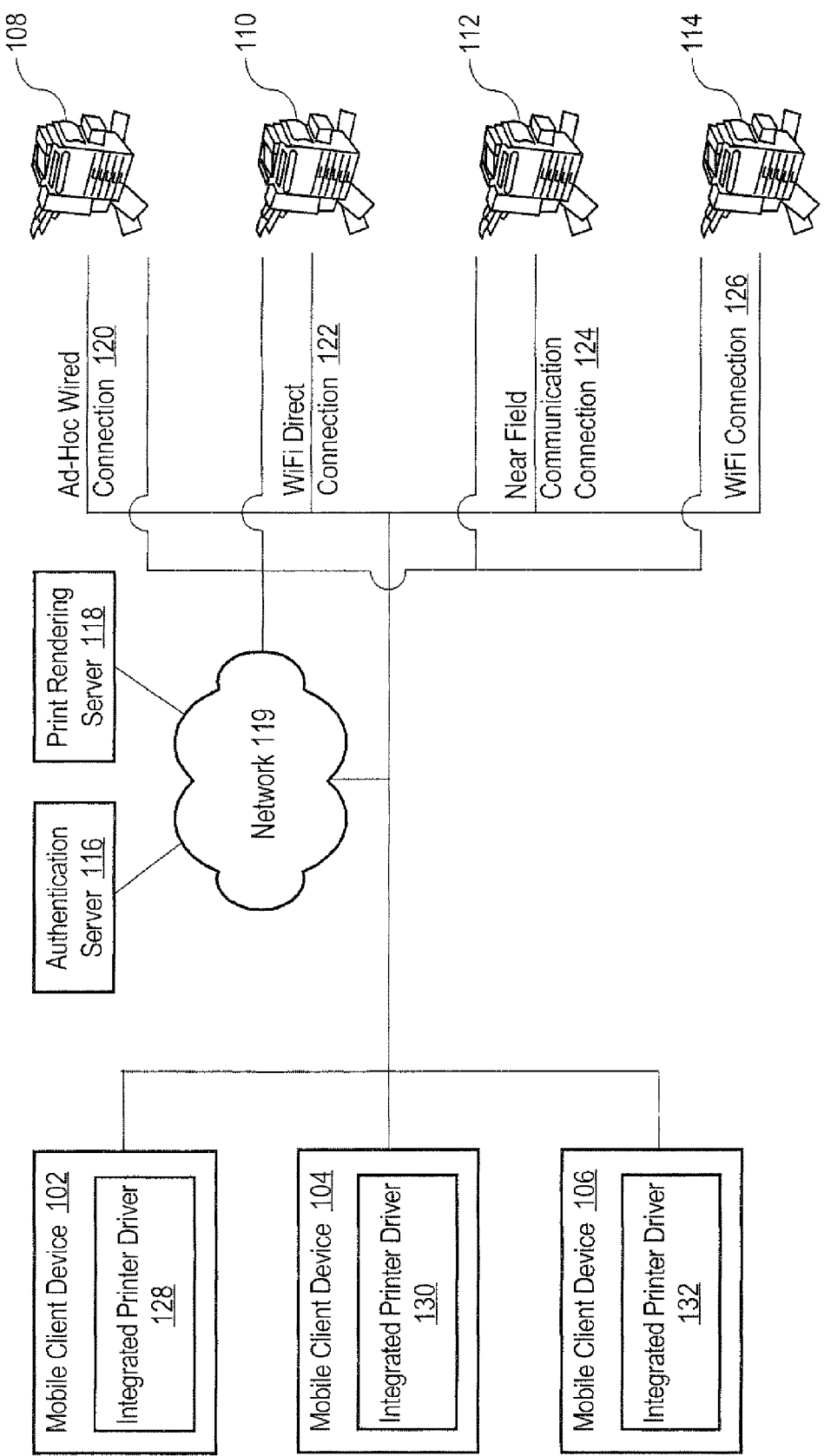
FIG. 1B is a block diagram that depicts an example ad-hoc printing device feature and option selection system.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

I. OVERVIEW
II. AD-HOC PRINTING FEATURE AND OPTION SELECTION SYSTEM
III. OVERVIEW OF PRINTING FROM A MOBILE CLIENT DEVICE TO AN AD-HOC PRINTING DEVICE
IV. EXAMPLE PRINTER DRIVER COMPONENTS
V. PRINTING DEVICE INFORMATION DATA FLOW
VI. DISCOVERING AND ADDING NEW AD-HOC PRINTING DEVICES
VII. CREATING USER INTERFACE DATA
VIII. PRINTING FROM A MOBILE CLIENT DEVICE TO AN AD-HOC PRINTING DEVICE
IX. QUERYING A NEW PRINTING DEVICE
X. DATA FLOW GENERIC PRINTER DESCRIPTION DATA
XI. MULTIPLE VERSIONS OF GPDD
XII. EXAMPLE GPDD
XIII CHANGING A SELECTION FILTER PREFERENCE
XIV. CHANGING UI FEATURE/OPTION
XV. JOB TICKET CREATION
XVI. PRINTER SELECTION PREFERENCE MENU
XVII. EXAMPLE PRINTER DRIVER USER INTERFACE
XVIII. ESTABLISHING AN AD-HOC COMMUNICATIONS LINK
XIX. RE-PRINTING PRINT JOBS AND LOCATING AD-HOC PRINTING DEVICES
XX. IMPLEMENTATION MECHANISMS

I. Overview

An approach is provided for printing from mobile client devices to ad-hoc printing devices. An integrated printer driver provides a single, combined user interface for printing to multiple ad-hoc printing devices. The integrated printer driver includes the capability to discover available ad-hoc printing devices and obtain the features and options currently supported by those ad-hoc printing devices. The integrated printer driver provides a unified, feature-oriented user interface for the ad-hoc printing devices that allows a user to specify features and options for printing an electronic document. The integrated printer driver includes the capability to automatically select a particular ad-hoc printing device based upon the user's selected feature and option set. The integrated printer driver allows a user to print an electronic document prior to an ad-hoc communications link being established with the particular ad-hoc printing device. After the ad-hoc communications link has been established, the integrated printer driver determines whether the particular ad-hoc printing device is capable of successfully processing the print job.

According to one embodiment, this includes determining whether features and options specified for the print job, for example via a corresponding print ticket, are currently supported by the ad-hoc printing device. If not, then the integrated printer driver provides a user interface that allows a user to resolve any conflicts, for example, by changing one or more features and options specified for the print job. Rendering of an un-rendered print job is performed by a print rendering server. For example, the integrated print driver sends the un-rendered print job to the print rendering server. Authentication via an authentication server may be used to authenticate a user of the mobile client device prior to the integrated print driver sending the un-rendered print job to the print rendering server. The print rendering server generates a rendered print job and provides the rendered print job to the target ad-hoc printing device, back to the mobile client device, or both to the target ad-hoc printing device and the mobile client device. If the print job cannot be successfully processed by the ad-hoc printing device, for example because of an error on the ad-hoc communications link or at the ad-hoc printing device, the integrated printer driver allows a user to re-submit the print job to the same ad-hoc printing device or to a different ad-hoc printing device. The approach also allows user to re-submit print jobs that have been successfully processed, for example, to provide additional copies of electronic documents. The approach also provides a user-friendly approach for users to locate available ad-hoc printing devices. This approach provides a flexible and user-friendly experience for printing from mobile client device to ad-hoc printing devices and may reduce the amount of computational resources, storage resources and battery power that would normally be required to render the print job.

II. Ad-hoc Printing Feature and Option Selection System

FIG. 1A is a block diagram that depicts an example ad-hoc printing device feature and option selection system 100, according to an embodiment. System 100 includes mobile device clients 102, 104, 106, (102-106) communicatively coupled to ad-hoc printing devices 108, 110, 112, 114 (108-114), an authentication server 116 and a print rendering server 118. Mobile device clients 102-106 are communicatively coupled to authentication server 116 and print rendering server 118 via network 119. Network 119 may be implemented by any type of communications links that may vary depending upon a particular implementation and embodiments are not limited to network 119 being implemented by any particular type of communications links. Example implementations of network 119 include, without limitation, one or more wired or wireless networks, including the Internet. The elements depicted in FIG. 1 may also communicate via any number of direct communications links between the elements. In the example depicted in FIG. 1A, ad-hoc communications links are established with ad-hoc printing devices 108-114. The approaches described herein for printing from mobile client devices to ad-hoc printing devices may use a wide variety of ad-hoc communications links that may vary depending upon a particular implementation and the approaches are not limited to any particular type of ad-hoc communications links. In the example depicted in FIG. 1A, an ad-hoc wired connection is established with ad-hoc printing device 108, a WiFi direct connection 122 is established with ad-hoc printing device 110, a near field communication connection 124 is established with ad-hoc printing device 112 and a WiFi connection 126 is established with ad-hoc printing device 114. These ad-hoc communications links are provided as examples and the approaches described herein are not limited to these example ad-hoc communications links and are applicable to other types of ad-hoc communications links.

As depicted in FIG. 1B, ad-hoc printing devices 108-114 may have connections to network 119, either in place of or in addition to the ad-hoc connections. The connections between ad-hoc printing devices 108-114 and network 119 may be wired or wireless, depending upon a particular implementation and the types of connections may vary among the individual ad-hoc printing devices 108-114.

Mobile client devices 102-106 may be any type of mobile client device that may vary depending upon a particular implementation and the approaches described herein are not limited to any particular type of mobile wireless device. Example mobile wireless devices include, without limitation, personal computers, workstations, laptop computers, tablet computing devices, personal digital assistants, smart phones and other telephony devices. Mobile client devices 102-106 each include an integrated printer driver 128, 130, 132, respectively, that is configured to providing printing to ad-hoc printing devices 108-114, as described in more detail hereinafter. Although embodiments are described herein in the context of three mobile printing devices (102-106), the approaches described herein are applicable to any number and types of mobile printing devices.

Ad-hoc printing devices 108-114 may be any type of device that includes printing functionality. Ad-hoc printing devices 108-114 are not limited to printers per se and may include printing devices that include other functionality. Examples of ad-hoc printing devices 108-114 include, without limitation, printers, copiers and multi-function peripherals (MFPs).

Authentication server 116 is a device that is capable of authenticating users and/or client devices. Authentication generally involves validating user credentials, for example a user name and password, against an authority. Authentication server 116 may utilize various authentication services, for example, one or more authentication, authorization and accounting (AAA) servers. Print rendering server 118 includes capabilities for obtaining printing device capabilities data from ad-hoc printing devices 108-114 and for rendering print jobs on behalf of mobile device clients 102-106. Authentication server 116 and print rendering server 118 are depicted in the figures as separate elements for explanation purposes only and authentication server 116 and print rendering server 118 may be implemented on a stand-alone computing element, such as a server, or on mobile client devices 102-106. The functionality of authentication server 116 and print rendering server 118 may be implemented using stored program logic, in a special-purpose computer or loaded from one or more non-transitory media into the memory of a general-purpose computer and then executed. Printing device capabilities data is data that specifies the features and options, i.e., allowed values for each feature, currently supported by ad-hoc printing devices 108-114. Examples features include, without limitation, a paper tray, duplex printing, stapling, hole punching, etc. Each feature has one or more options, i.e., values. Some features may only have two options. For example, duplex printing has two options, such as "Installed" or "Not Installed." Other features, for example, paper size, may have many options, e.g., "A4", "legal", "8½×11", etc.

Embodiments are not limited to any particular technique for print rendering server 118 obtaining printing device capabilities data from ad-hoc printing devices 108-114. For example, print rendering server 118 may use SNMP or WSD technologies to obtain printing device capabilities data from ad-hoc printing devices 108-114. Recent development of WSD technologies on a network provides opportunities for more advanced device management (e.g., relative to SNMP). Such development allows any network device to report its full (e.g., printing) capabilities during the establishment of a connection between the network device and another network device, such as a network server. Print rendering server 118 may itself automatically discover ad-hoc printing devices 108-114 via, for example, a device discovery technique. Alternatively, print rendering server 118 may be notified of one or more of ad-hoc printing devices 108-114 by an administrator. Upon detection, print rendering server 118 queries the detected ad-hoc printing devices 108-114 (local or remote) for information about the ad-hoc printing devices 108-114 including, but not limited to, print features and options and other capabilities supported by the ad-hoc printing devices 108-114.

Based on the printing device capabilities data, print rendering server 118 causes the integrated printer drivers 128-132 to be generated and provided to mobile client devices 102-106. Additionally or alternatively, print rendering server 118 causes the printing device capabilities data to be transmitted to mobile client devices 102-106 that (already) execute the integrated printer drivers 128-132 at the time print rendering server 118 receives the device capabilities data from ad-hoc printing devices 108-114. In this situation, integrated printer drivers 128-132 are updated to include the new printing device capabilities data.

Print rendering server 118 builds an information database and creates various data structures for integrated printer drivers 128-132. Such data structures may be accessed by UI components of integrated printer drivers 128-132 when integrated printer drivers 128-132 display an integrated UI to a user of one of mobile client devices 102-106.

After integrated printer drivers 128-132 are received by and installed at mobile client devices 102-106, integrated printer drivers 128-132 display an integrated UI that contains features from multiple ad-hoc printing devices (e.g., ad-hoc printing devices 108-114). Some features on the UI are automatically enabled or disabled based on a feature set a user has previously selected and whether any ad-hoc printing devices can support the selected feature set. Based on the feature set of the user's selection, integrated printer drivers 128-132 determines which ad-hoc printing device 108-114 will be used for printing and saves the feature set to a destination print job ticket. A rendering component of integrated printer driver 128-132 causes a print job to be transmitted to an ad-hoc printing device (e.g., ad-hoc printing devices 108-114) specified in the print ticket.

Figure 2B:
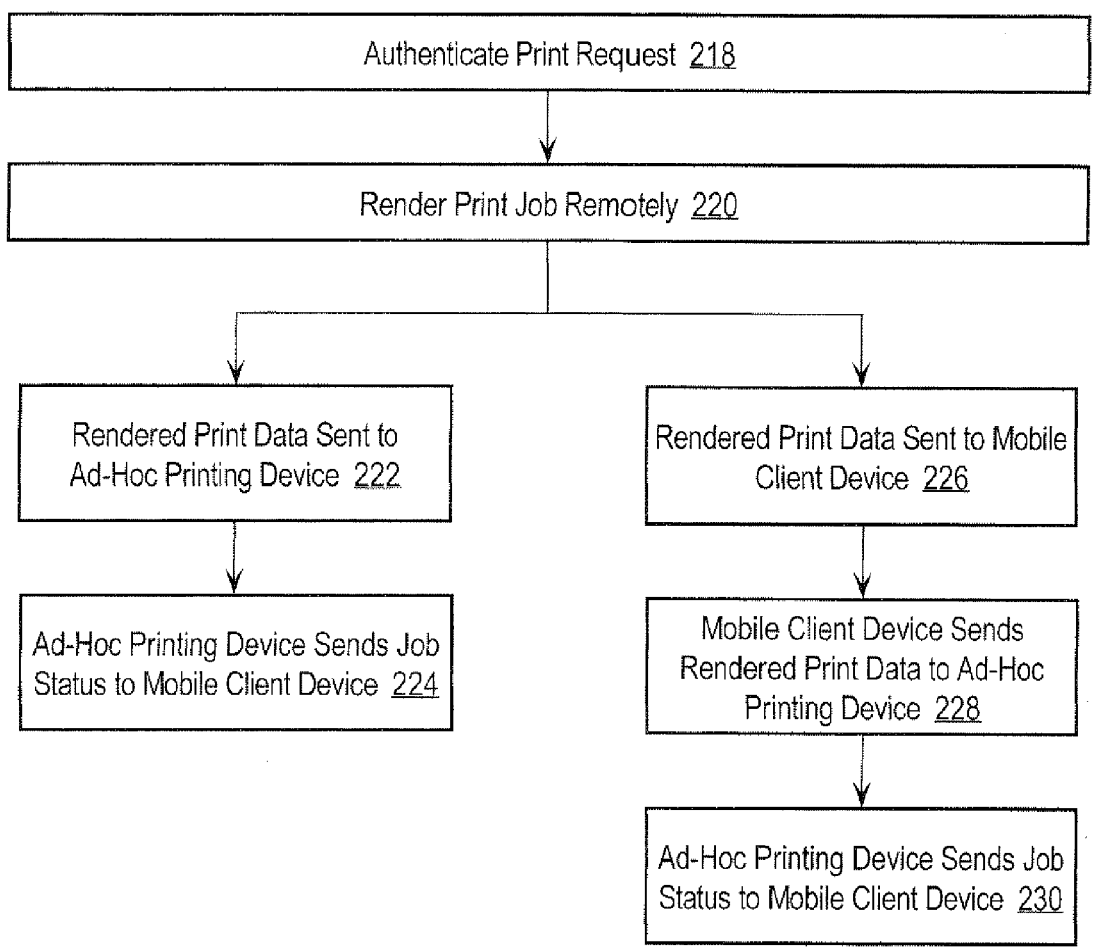

III. Overview of Printing From a Mobile Client Device to an Ad-Hoc Printing Device FIGS. 2A & 2B are a flow diagram that depicts an example process 200 for generating a print job, according to an embodiment. At step 202, one or more ad-hoc communications links are established with one or more ad-hoc printing devices. For example, ad-hoc communications links may be established between mobile client device 102 and any of ad-hoc printing devices 108-114. This may include, for example, a user moving mobile client device 102 within range of and pairing the mobile client device 102 with ad-hoc printing devices 108-114.

In step 204, printing device capabilities data is obtained from the ad-hoc printing devices 108-114 for which an ad-hoc communications link has been established. This may include, for example, the integrated printer driver 128 querying the ad-hoc printing devices 108-114 to obtain printing device capabilities data that specifies features and options currently supported by the ad-hoc printing devices 108-114. Databases maintained by integrated print driver 128, or other entities accessible by integrated print driver 128 such as a print server, and/or mobile client devices 102-106 are also updated, as described in more detail hereinafter.

In step 206, a user initiates printing of an electronic document from mobile client device 102 and integrated printer driver 128 displays a user interface of printing features and options. At step 208, the user selects printing features and options to be used to print the electronic document. At step 210, integrated printer driver 128 selects a particular ad-hoc printing device to print the electronic document and the user confirms the selected ad-hoc printing device. In step 212, the un-rendered print job is held and not rendered until the selected ad-hoc printing device is connected, i.e., until an ad-hoc communications link is established with the selected ad-hoc printing device.

Once the ad-hoc communications link is established with the selected ad-hoc printing device, then in step 214, the current features and options supported by the selected printing device are obtained and the print job ticket is validated. This may include, for example, the integrated printer driver 128 querying the selected ad-hoc printing device to obtain printing device capabilities data that specifies features and options currently supported by the selected ad-hoc printing devices and comparing those features and options to the features and options specified by the print job ticket.

In step 216, one or more conflicts or inconsistencies between the features and options specified by the print job ticket and the features and options that are currently supported by the selected ad-hoc printing device are resolved. This may include, for example, the integrated printer driver 128 displaying, on a user interface, data that identifies the conflicts or inconsistencies and allows the user to change one or more features and options specified for the print job to resolve the conflicts. For example, suppose that when the features and options for the selected ad-hoc printing device were originally obtained that the selected ad-hoc printing device supported color printing. Suppose further that the user had requested that the electronic document be printed using color printing and that the selected printing device was changed to no longer support color printing. Steps 214 and 216 provide for detection and resolution of this conflict, for example, by the user selecting black and white printing for the electronic document or by the user selecting another ad-hoc printing device.

In step 218, a print request is optionally authenticated. This may include, for example, the integrated print driver 128 transmitting to authentication server 116 a print request with a print job ticket and the electronic data to be printed. The print request may also include user credential information, for example, a user ID and password of a user of the mobile client device. The authentication server 116 authenticates the user credential information and provides a response to the integrated print driver 128.

Assuming that the print request was successfully authenticated in step 218, then in step 220, the un-rendered print job is rendered remotely. This includes the integrated print driver 128 sending the print job ticket and the electronic document to be printed to the print rendering server 118 for rendering. The print rendering server 118 generates rendered print data that includes the printer description language (PDL) commands necessary to print the electronic document on the designated ad-hoc printing device using the features and options specified in the print job ticket.

After the print job is rendered, the rendered print job may be provided either directly to the designated ad-hoc printing device or back to the mobile client device, or both to the designated ad-hoc printing device and the mobile client device. In step 222, the rendered print data may be sent to the ad-hoc printing device. For example, the print rendering server 118 may transmit the rendered print job directly to the ad-hoc printing device designated in the print request, using, for example, a network address of the ad-hoc printing device. In step 224, the designated ad-hoc printing device may generate and transmit to the integrated print driver 128 a job status indicating the status of the print job. In step 226, the rendered print data may be sent back to the mobile client device. For example, the print rendering server 118 may transmit the rendered print job back to the integrated print driver 128 on the mobile client device from which the print request originated. In step 228, the integrated print driver 128 sends the rendered print job to the designated ad-hoc printing device and in step 230, the ad-hoc printing device may generate and transmit to the integrated print driver 128 a job status indicating the status of the print job.

IV. Example Printer Driver Components

FIG. 3 is a block diagram that depicts example components of integrated printer driver 128 and a print server 316 and the interaction of those components with respect to ad-hoc printing devices 302-306. Print server 316 includes device information databases 318-322, one for each of ad-hoc printing devices 302-306. Thus, device information database 318 stores ad-hoc printing device capabilities data for ad-hoc printing device 302, device information database 320 stores ad-hoc printing device capabilities data for ad-hoc printing device 304 and device information database 322 stores ad-hoc printing device capabilities data for ad-hoc printing device 306. Device information databases 318-322 are depicted separately in FIG. 3 for purposes of explanation only and the information in device information databases 318-322 may be stored in a single information database on one or more computing devices, depending upon a particular implementation.

Print server 316 communicates with ad-hoc printing devices 302-306 via ad-hoc communications links, such as WiFi, NFC or WiFi Direct communications links as depicted in FIG. 3. Print server 316 retrieves, from ad-hoc printing devices 302-306, ad-hoc printing device capabilities data that indicates the features and options currently supported by ad-hoc printing devices 302-306. The ad-hoc printing device capabilities data may be retrieved using a wide variety of techniques that may vary depending upon a particular implementation. Example techniques include, without limitation, Web Services Discovery and SNMP queries. Print server 316 is depicted in the figures and described in the context of an element that is separate from integrated printer driver 128, but embodiments are not limited to this example and the functionality of print server 316 may be implemented in integrated printer driver 128.

Integrated printer driver 128 includes an integrated UI component 308, a driver update component 310, a rendering component 312a and an ad-hoc printing device manager 314. Integrated UI component 308 generates a graphical user interface (GUI) and causes the GUI to be displayed on a user interface of the client device upon which integrated printer driver 128 is installed, for example mobile client devices 102-106. Driver update component 310 is configured to obtain ad-hoc printing device capability data from print server 316 for one or more of ad-hoc printing devices 302-306. Rendering component 312 receives feature selections (whether user selected, default, or a combination of both), selects an ad-hoc printing device to print and electronic document, and generates a print job that specifies the one or more documents and the feature selections. Rendering component 312 passes the print job to ad-hoc printing device manager 314.

Ad-hoc printing device manager 314 is configured to query ad-hoc printing devices 302-306 for ad-hoc printing device capability data. Ad-hoc printing device manager 314 is also configured to causing print jobs to be transmitted to the appropriate ad-hoc printing devices. Ad-hoc printing device manager 314 may implement one or more communication protocols in order to cause print job to be transmitted to the appropriate ad-hoc printing device. For example, integrated printer driver 128 may cause a first print job to be transmitted to ad-hoc printing device 302 via a Web Services Device port and integrated printer driver 128 may cause a second print job to be transmitted to ad-hoc printing device 304 via a TCP/IP port.

V. Printing Device Information Data Flow

Figure 4:
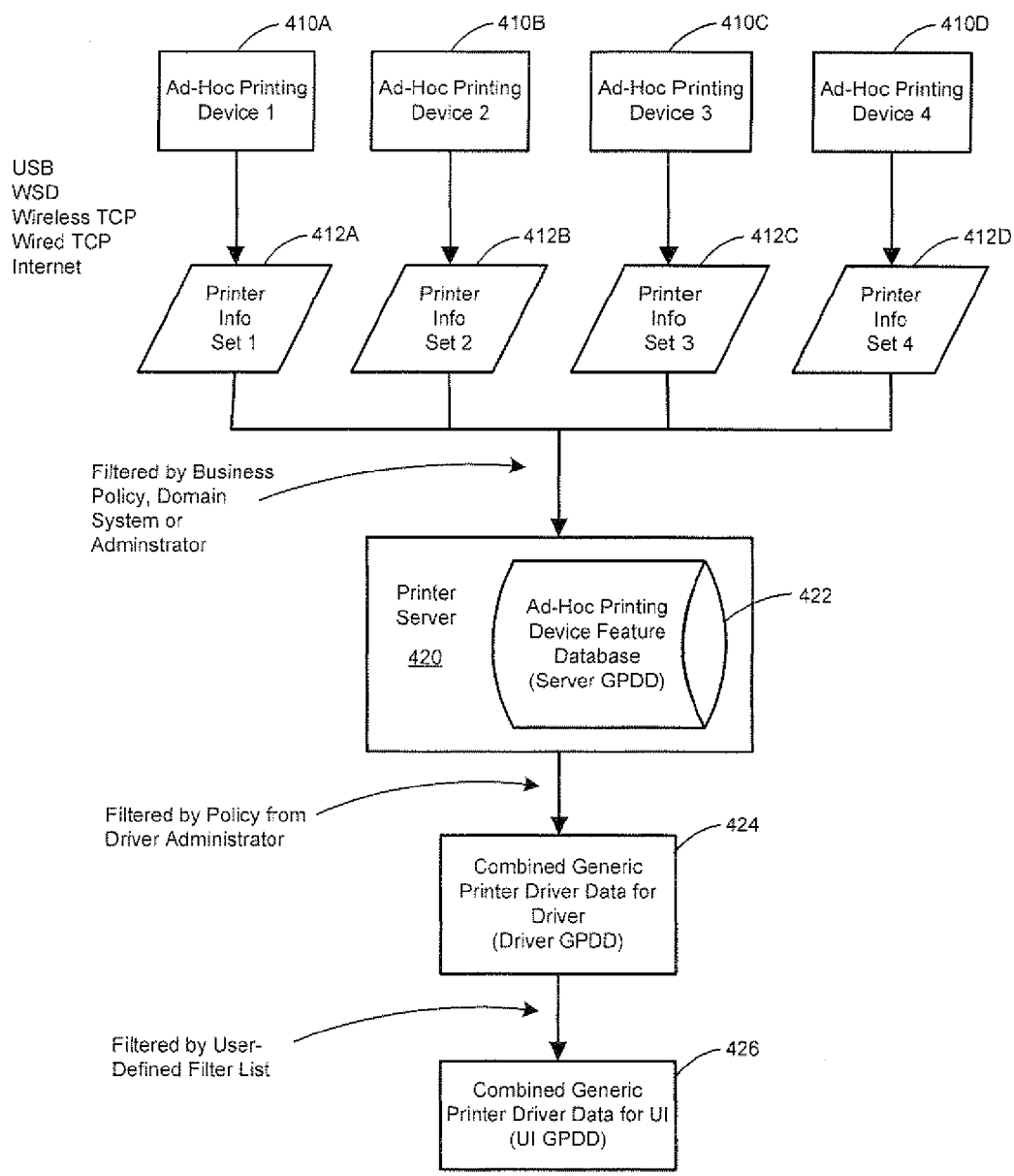
FIG. 4 is a block diagram that depicts a data flow of printing device information from multiple ad-hoc printing devices to a print server.

FIG. 4 is a block diagram that depicts a data flow of printing device information from multiple ad-hoc printing devices 410A-D to a printer server 420, according to an embodiment. Each ad-hoc printing device 410A-D provides a printing information (info) set to printer server 420. For example, printing devices 410A-D provide printer information sets 1-4, identified by reference numerals 412A-D, respectively, to printer server 420. Ad hoc printing devices 410A-D may communicate with printer server 420 using a wide variety of communication methods, such as USB (or Universal Serial Bus), WSD, wireless TCP, wired TCP, or the Internet. Although FIG. 4 depicts four ad-hoc printing devices 410A-D, embodiments are applicable to any number of ad-hoc printing devices.

Printer server 420 receives printer information sets 412A-D and, in an embodiment, applies one or more filter criteria to printer information sets 412A-D. The one or more filter criteria may be used to identify which ad-hoc printing devices are not allowed to be used (or "seen") by mobile client devices that are connected to printer server 420. In this embodiment, printer server 420 compares the one or more filter criteria to one or more attributes of an ad-hoc printing device (e.g., 410A), which are reflected in a printer information set (e.g., 412A) received from that ad-hoc printing device. Example filter criteria include whether the ad-hoc printing device supports a certain security policy or any security, whether the ad-hoc printing device supports a particular page description language (PDL), or any device with particular firmware versions. Additionally or alternatively, one or more filter criteria includes a list of ad-hoc printing devices that are allowed to be used by mobile client devices that are connected with printer server 420 (e.g., a "white" list) or a list of ad-hoc printing devices that are not allowed to be used by mobile client devices that are connected to printer server 420 (e.g., a "black" list). The one or more filter criteria may be established by a company administrator, or an administrator that is authorized by a business entity that owns and/or manages the local network.

If an ad-hoc printing device is not "filtered out" after the filter stage, then printer server 420 stores the printer information set of that ad-hoc printing device in an ad-hoc printer feature database 422. The data stored therein is referred to as the server generic printer description data (or "Server GPDD"). The Server GPDD, on a server when a mobile client device is connecting to a corporate domain network, or on the mobile client device when the mobile client device is disconnected from a corporate domain network, defines information on all ad-hoc printing devices (whether connected or not connected) that are available for all users of that mobile client device.

In an embodiment, printer information sets of ad-hoc printing devices that are "filtered" out after the filter stage are stored separate from the Server GPDD. Such storage may be on the same storage device that stores on the Server GPDD or on a different storage device. Such ad-hoc printer information sets may be maintained if, for example, the one or more filter criteria are later changed or updated, for example through user input. In such a scenario, the "excluded" printer information sets may be evaluated again based on the updated filter criteria. Such a re-evaluation might be triggered based on the changing of the one or more filter criteria. One or more of the excluded printer information sets might then pass the filter stage and end up being stored as part of the Server GPDD.

In an embodiment, the Server GPDD may be further filtered based on one or more additional filter criteria. Such additional criteria may be established by a driver administrator, who may be the same or different than the administrator that defines the filter criteria referenced above. Examples of such additional filter criteria include those criteria described previously and whether a particular user is allowed to use a particular ad-hoc printing device, which may be determined in multiple ways, such as a pre-defined list of ad-hoc printing devices that the particular user is allowed to use. The ad-hoc printer information sets of ad-hoc printing devices that are not "filtered out" by this additional filter criteria are referred to as "Driver GPDD." The Driver GPDD 424 defines information on all ad-hoc printing devices (whether connected or not) that are available for a particular user. Thus, each mobile client device that is communicatively coupled to (or registered with) printer server 420 might receive a different Driver GPDD. For example, the Server GPDD may include information only about ad-hoc printing devices 410A-C and not ad-hoc printing device 410D. Afterward, Driver GPDD 424 for one mobile client device might include information only about ad-hoc printing devices 410A-B while Driver GPDD 424 for another mobile client device might include information only about ad-hoc printing devices 410A and 410C.

The Driver GPDD 424 of a particular user becomes part of an integrated printer driver (whether generated by printer server 420 or another entity) that is installed on a mobile client device of the particular user.

In an embodiment, the Driver GPDD 424 is further filtered by one or more filter criteria that are defined by the associated user. For example, the associated user might indicate that they only want to see information about ad-hoc printing devices that are on a particular floor of a building, that support color, and that have a certain input bin size. The printing information sets that satisfy the filter criteria defined by the user will be part of a "UI GPDD" 426. The UI GPDD 426 for a particular user defines information on all connected ad-hoc printing devices that are available for the particular user. The UI GPDD 426 may be updated in real-time as the particular user makes selections about what characteristics or attributes a set of ad-hoc printing devices must have in order to be candidate ad-hoc printing devices for print jobs that are initiated by the particular user.

VI. Discovering and Adding New Ad-Hoc Printing Devices

A ad-hoc printing device is discovered and added to a print server when a print server obtains details about the ad-hoc printing device, such as an address (e.g., IP or MAC) of the ad-hoc printing device, communication protocol(s) that the ad-hoc printing device supports, physical location of the ad-hoc printing device (e.g., building number, floor level), and set of features and options that the ad-hoc printing device supports.

Figure 5A:
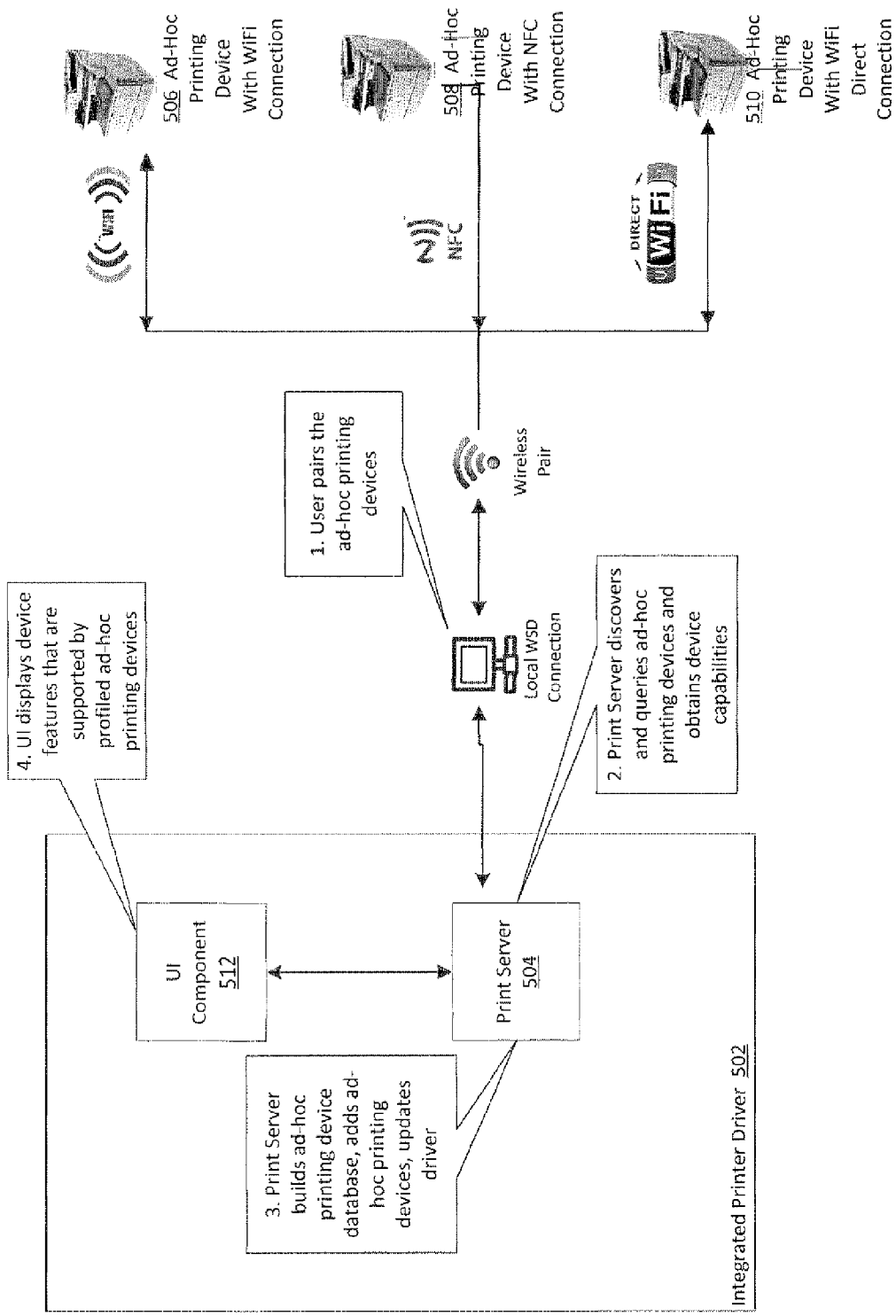
FIG. 5A is a block diagram that depicts an overview of a process for adding new ad-hoc printing devices.

FIG. 5A is a block diagram that depicts an overview of a process for adding new ad-hoc printing devices, according to an embodiment. An integrated printer driver 502 includes a print server 504 that discovers and adds new ad-hoc printing devices 506, 508, 510. Note that in this example, print server 504 is depicted and described as being part of integrated printer driver 502, but embodiments are not limited to this context and print server 504 may be implemented separate from integrated printer driver 502. As depicted in FIG. 5, in Step 1, a user pairs, via a local WSD connection, i.e., establishes ad-hoc communications links with, ad-hoc printing devices 506-510. In the present example, a WiFi connection is established with ad-hoc printing device 506, a NFC connection is established with ad-hoc printing device 508 and a WiFi Direct connection is established with ad-hoc printing device 510.

In Step 2, print server 504 discovers and queries ad-hoc printing devices 506-510, as previously described herein. This may include the use of a local WSD connection as depicted in FIG. 5. In Step 3, print server 504 builds an ad-hoc printing device database, adds the discovered ad-hoc printing devices 506-510 and updates the integrated printer driver 502. In Step 4, a UI component 512 of the integrated printer driver 502 displays devices features that are currently supported by the profiled ad-hoc printing devices 506-510, i.e., the ad-hoc printing devices 506-510 that have been discovered by print server 504 and for which print server 504 has obtained ad-hoc printing device capability data that specifies the current features and options supported by ad-hoc printing devices 506-510.

Figure 5B:
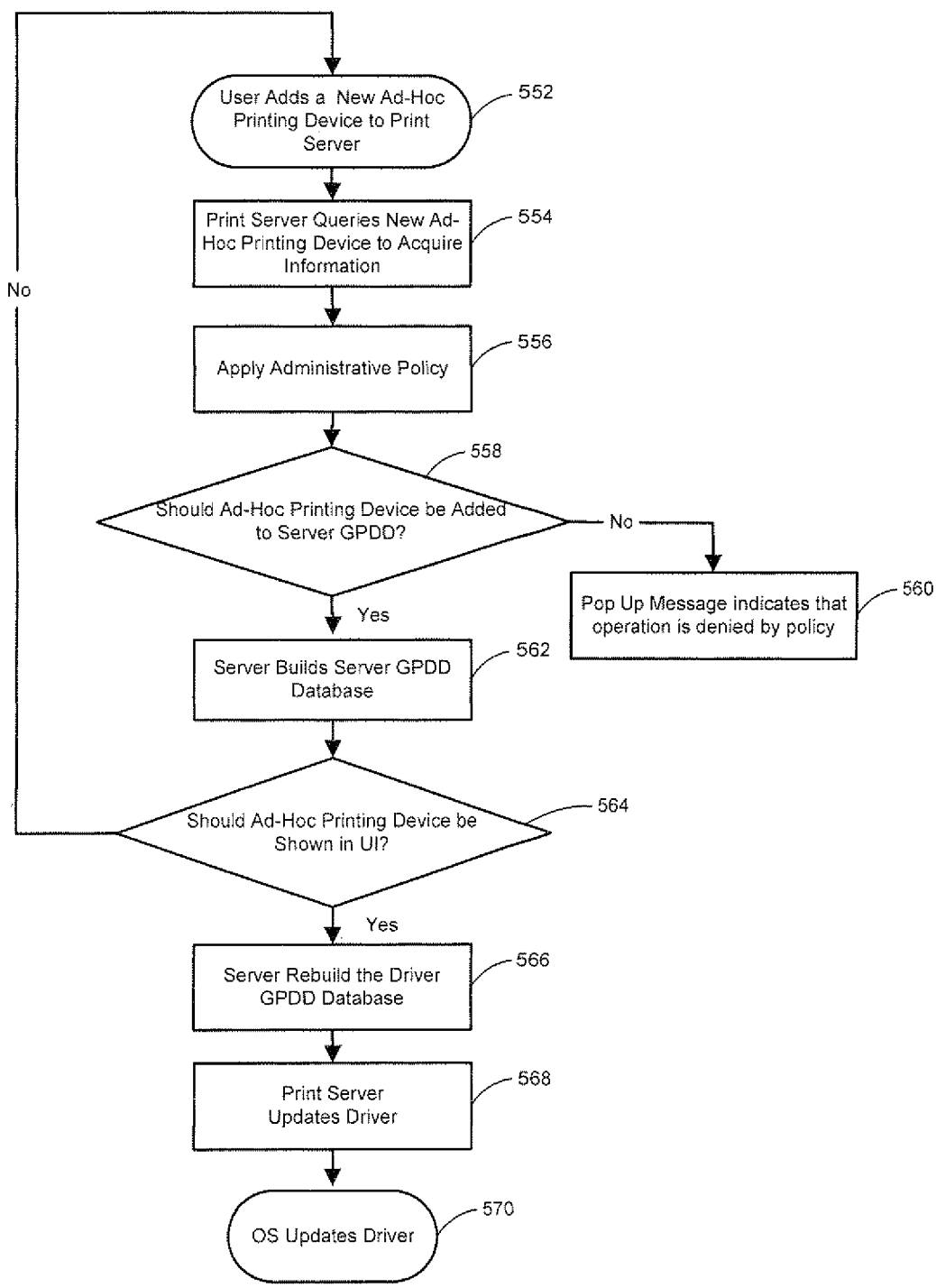
FIG. 5B is a flow diagram that depicts a process for adding an ad-hoc printing device to a print server.

FIG. 5B is a flow diagram that depicts a process 550 for adding a connected ad-hoc printing device to a print server, according to an embodiment. It is presumed that an ad-hoc communications link has been established with the ad-hoc printing device. At step 552, a user provides, to the print server, information about a new ad-hoc printing device. Example information includes, without limitation, a network IP address, an Internet IP address or a MAC address of the ad-hoc printing device. The ad-hoc printing device may be local to (i.e., on the same network as) or remote to (i.e., not on the same network as) the print server. Alternatively, the print server may automatically discover the new ad-hoc printing device. Such automatic discovery may be achieved in multiple ways. For example, upon an ad-hoc communications link being established with the new ad-hoc printing device, the new ad-hoc printing device implements a Web Services Discovery specification by transmitting a HELLO multicast message to devices on the network. The print server receives the HELLO message, responds with a message that identifies the print server. If both the print server and the new ad-hoc printing device implement a Web Services Metadata Exchange specification, then the print server sends a metadata request message to the new ad-hoc printing device in order to retrieve information about how to request certain information about the new ad-hoc printing device, such as ad-hoc printing device capabilities data.

At step 554, the print server queries the new ad-hoc printing device for certain information, such as capabilities data of the ad-hoc printing device, any security protocols the ad-hoc printing device supports, etc.

At step 556, the print server applies an administrative policy to at least some of the information retrieved from the ad-hoc printing device. The administrative policy indicates that the ad-hoc printing device must support a particular PDL (or page description language), the ad-hoc printing device appears on a specified company list, and the ad-hoc printing device uses secure communication.

At step 558, the print server determines, based on the administrative policy, whether the ad-hoc printing device should be added to the Server GPDD. If not, then process 500 proceeds to step 560, where the print server causes a message to be displayed that indicates that the "add" operation is denied. If the print server determines that the ad-hoc printing device should be added to the Server GPDD, then process 500 proceeds to step 562.

At step 562, the print server builds the Server GPDD database. This step may comprise adding the retrieved information about the new ad-hoc printing device to the Server GPDD database.

At step 564, the print server uses another policy to determine whether the new ad-hoc printing device should appear in a UI of a printer driver. The other policy may be defined by a driver administrator and determines whether a mobile client device is able to "see" certain ad-hoc printing devices. If the result of step 564 is in the negative, then process 500 proceeds to a point prior to step 552, indicating that further input regarding a new ad-hoc printing device is required to proceed. If the result of step 564 is in the affirmative, then process 500 proceeds to step 566.

At step 568, the print server rebuilds a Driver GPDD. This step may comprise adding the retrieved information about the new ad-hoc printing device to a Driver GPDD.

At step 570, the print server sends the retrieved information to an operating system of a mobile client device that executes a printer driver. At step 570, the operating system updates the printer driver based on the retrieved information. Alternatively, a user might decide to update the driver at a later time.

VII. Creating User Interface Data

Figure 6:
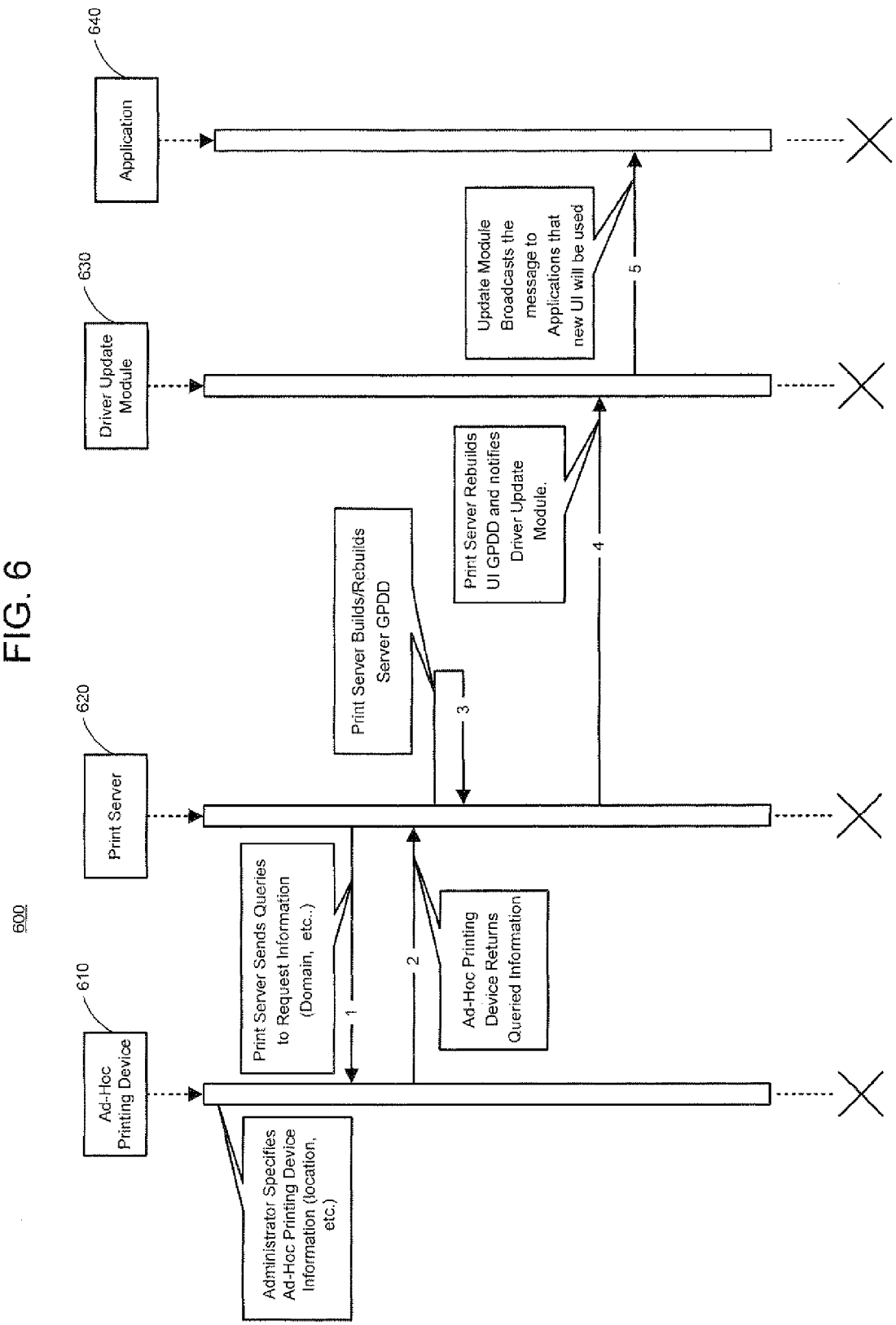
FIG. 6 is a sequence diagram that depicts a process for creating user interface data.

FIG. 6 is a sequence diagram that depicts a process 600 for creating user interface data, according to an embodiment. An ad-hoc printing device 610 receives, from an administrator, ad-hoc printing device information. Example information includes, without limitation, a name of a company that owns ad-hoc printing device 610 and location of ad-hoc printing device 610, such as a building number, floor, section, department name, maintenance group name, etc. Such information might be received before ad-hoc printing device 610 is installed. Such information depends on user's input, not the device's native information. Also, such information may be received through a device control panel of ad-hoc printing device 610.

At step 1, a print server 620 sends one or more queries to ad-hoc printing device 610 to request information about ad-hoc printing device 610, including capabilities of ad-hoc printing device 610. One or more techniques may be used to send the one or more queries, including, but not limited to, WS Discovery queries, an OS network API, SNMP queries, etc.

At step 2, ad-hoc printing device 610 returns, to print server 620, the information that print server 620 requested.

At step 3, print server 620 checks one or more company or domain administrative policies and builds (or rebuilds) a Server GPDD based on the retrieved information.

At step 4, print server 620 checks a user policy and builds (or rebuilds), based on the retrieved information, a Driver GPDD for each user that is authorized to use ad-hoc printing device 610.

At step 5, print server 620 sends the retrieved information to the OS about updating each printer driver user that is authorized to use the ad-hoc printing device. The OS, in turn, notifies a driver update component 630 that is part of the printer driver. Driver update component 630 updates the driver's UI data. If a driver UI component of the printer driver is already processing a print job, then driver update component 630 might include adequate solutions to ensure that the new UI update does not affect existing print jobs.

At step 6, driver update component 630 might broadcast, to one or more applications 640 executing on the client device, a message that a new UI will be used. For some printing applications, it is important to inform the user that one or more ad-hoc printing device properties have changed, such as when a staple unit is removed. A user should be notified to avoid sending print jobs that require the staple unit.

VIII. Printing From a Mobile Client Device to an Ad-Hoc Printing Device

Figure 7A:
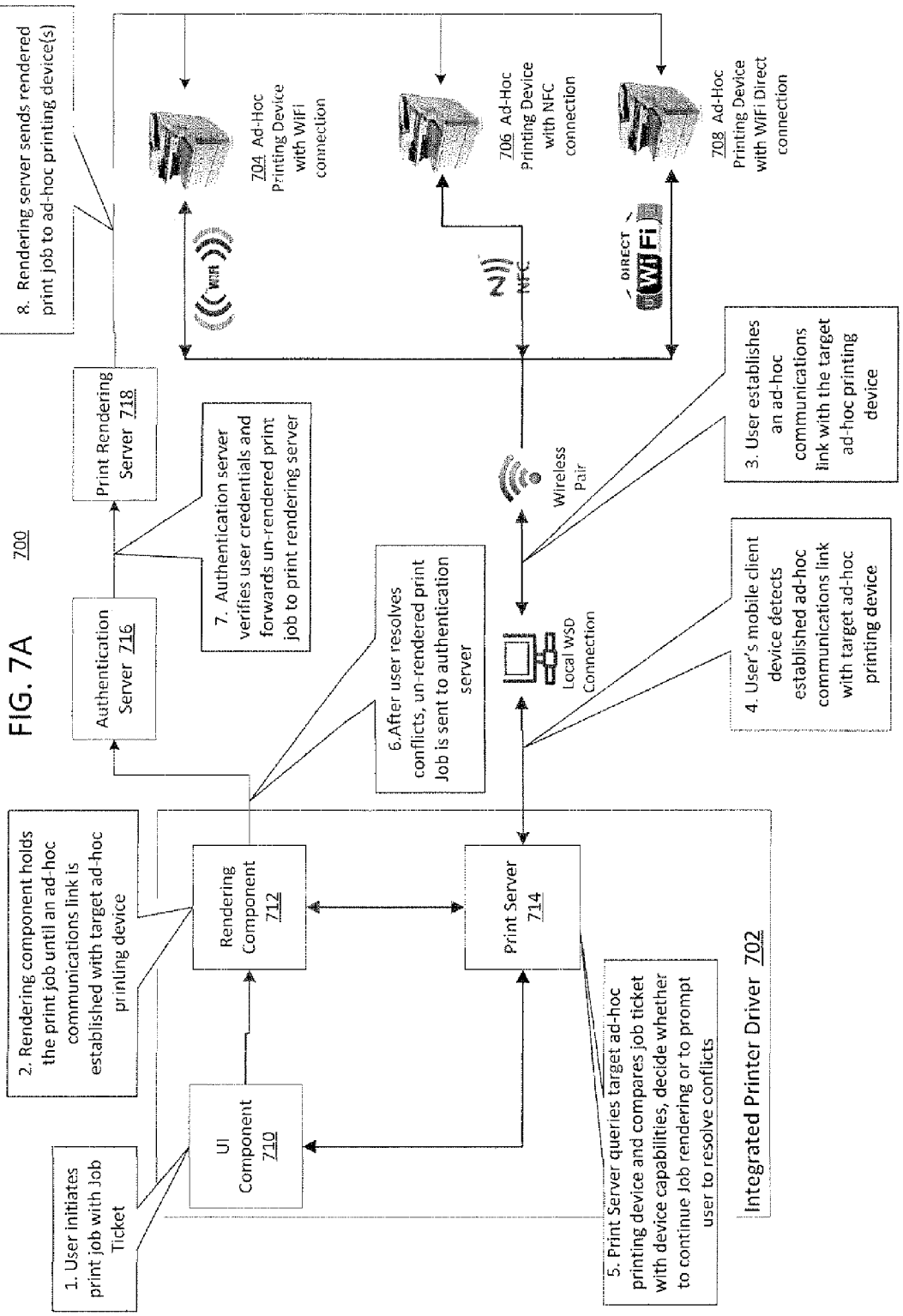
FIG. 7A is a block diagram that depicts an overview of a process for printing from a mobile client device to an ad-hoc printing device.

FIG. 7A is a block diagram 700 that depicts an overview of a process for printing from a mobile client device to an ad-hoc printing device. In the process depicted in FIG. 7A, the rendered print job data generated by the print rendering server 718 is provided to one or more ad-hoc printing devices. In the process depicted in FIG. 7B and explained below, the rendered print job data generated by the print rendering server 718 is provided back to the integrated print driver 702. Embodiments are not limited to the rendered print job data being supplied solely to either one or more ad-hoc printing devices or a mobile client device and rendered print job data may be supplied by the print rendering server 718 to one or more ad-hoc printing devices and one or more mobile client devices.

In FIG. 7A, an integrated print driver 702 is implemented on a mobile client device (not shown) and interacts with ad-hoc printing devices 704, 706, 708. Integrated print driver 702 includes a UI component 710, a rendering component 712 and a print server 714. In this example print server 714 is implemented as part of integrated printer driver 702 for purposes of explanation but embodiments are not limited to this example and print server 714 may be implemented separate from integrated print driver 792.

In Step 1, a user initiates a print job with a job ticket via UI component 710. This may include, for example a user requesting to print a particular electronic document on a particular ad-hoc printing device, referred to in this example and depicted in FIG. 7 as the "target ad-hoc printing device," and selecting, via UI component 710, features and options to be used to print the particular electronic document. The print job and print job ticket are provided to rendering component 712.

In Step 2, rendering component 712 holds the print job until an ad-hoc communications link is established with the target ad-hoc printing device that was specified by the user. In Step 3, the user establishes an ad-hoc communications link with the target ad-hoc printing device. This may include, for example, a user moving the mobile client device into close proximity of the target ad-hoc printing device and initiating an ad-hoc communications link with the target ad-hoc printing device, e.g., pairing the mobile client device to the target ad-hoc printing device. In Step 4, the user's mobile client device detects that the ad-hoc communications link has been established between the mobile client device and the target printing device.

In Step 5, in response to the ad-hoc communications link being established between the mobile client device and the target printing device, print server 714 queries the target ad-hoc printing device to obtain ad-hoc printing device capability data that specifies the features and options currently supported by the target ad-hoc printing device. Print server 714 compares the features and options currently supported by the target ad-hoc printing device to the features and options specified in the print job ticket to determine whether any conflicts exist, i.e., whether the target ad-hoc printing device currently supports the features and options necessary to process the print job. It is presumed in this example that print server 714 has access to the print job ticket for the print job. If any conflicts exist, then print server 714 causes UI component 710 to display one or more GUI objects that allow the user to resolve the conflicts, for example, by changing one or more of the features and options to be used to print the print job.

In Step 6, after any conflicts are resolved by the user, the un-rendered print job is sent to authentication server 716. Authentication server 716 authenticates the un-rendered print job with respect to one or more users of the mobile client device, for example, based upon credential information for the one or more users of the mobile client device. The use of authentication server 716 as depicted in Step 6 is optional and may not be used in some implementations. In Step 7, the un-rendered print job is provided to the print rendering server 718 for rendering. In situations where authentication is not used, the un-rendered print job may be provided by the integrated print driver 702 to the print rendering server 718. The print rendering server 718 generates a rendered print job and in Step 8, provides the rendered print job to one or more ad-hoc printing devices 704-708.

Figure 7B:
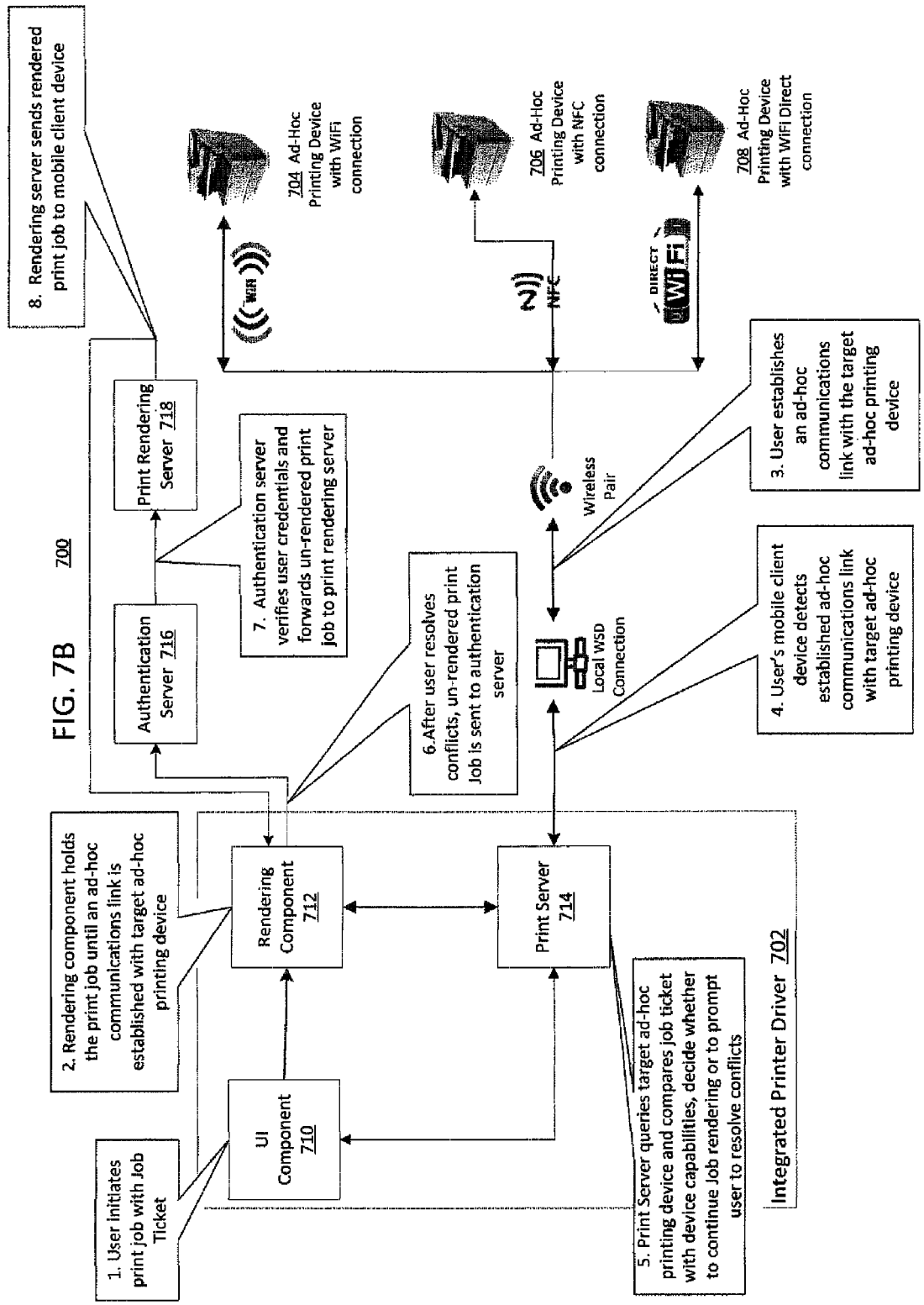
FIG. 7B is a block diagram that depicts an overview of a process for printing from a mobile client device to an ad-hoc printing device.

In FIG. 7B, Steps 1-7 are the same as in FIG. 7A. In Step 8 of FIG. 7B, after the print rendering server 718 has generated the rendered print job, the print rendering server 718 provides the rendered print job back to the integrated print driver 702 on the mobile client device.

Figure 8:
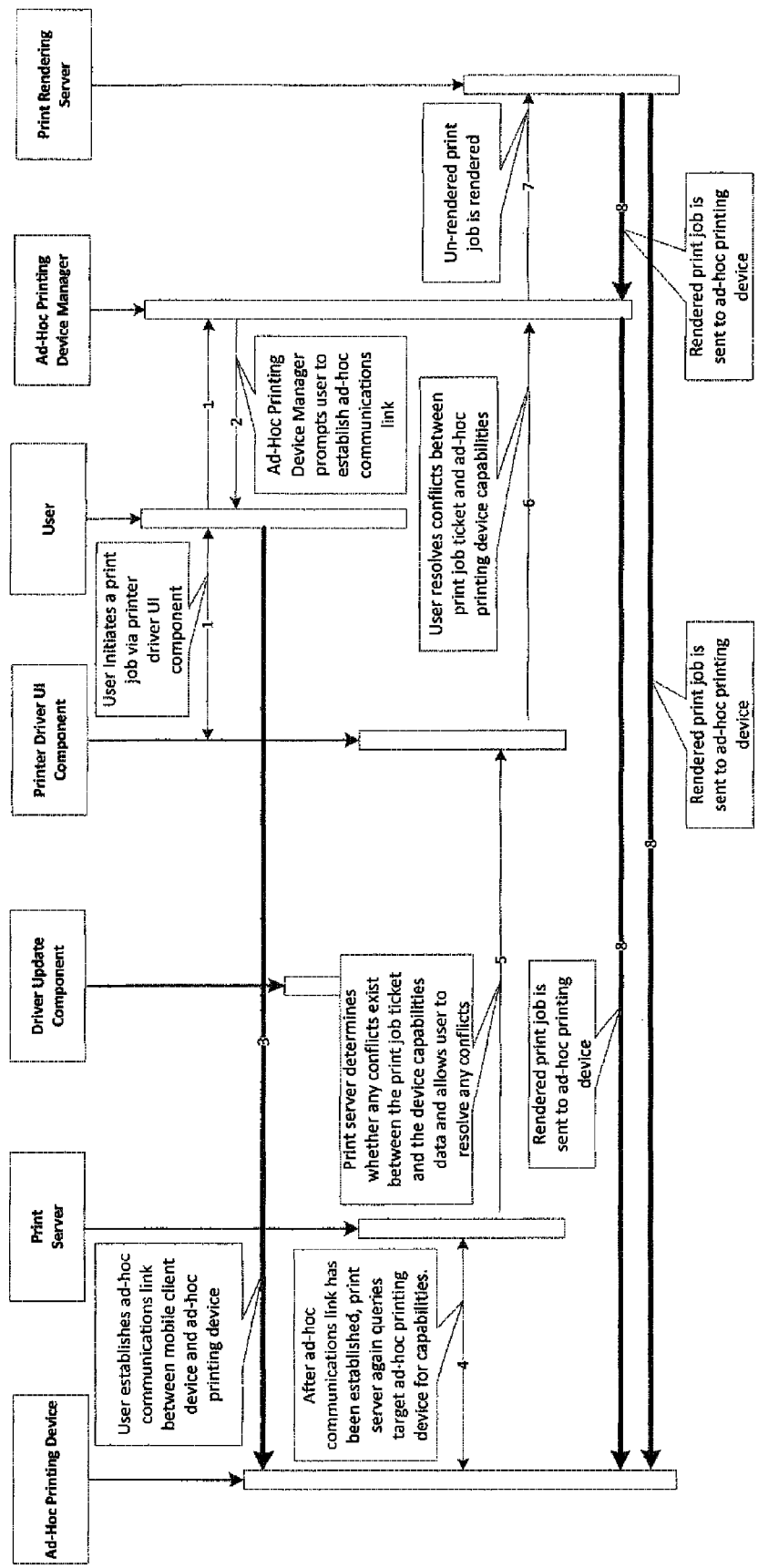
FIG. 8 is a sequence diagram that depicts a process for printing from a mobile client device to an ad-hoc printing device.

FIG. 8 is a sequence diagram 800 that depicts a process for printing from a mobile client device to an ad-hoc printing device, according to an embodiment. It is presumed in this sequence for purposes of explanation that a print server in an integrated printer driver has discovered one or more available ad-hoc printing devices and has obtained, from those ad-hoc printing devices, ad-hoc printing device capability data that specifies features and options supported by those ad-hoc printing devices.

In Step 1, a User initiates a print job via a printer driver UI component. This may include, for example a user requesting to print a particular electronic document on a particular ad-hoc printing device, referred to in this example as the "target ad-hoc printing device," and selecting, via the printer driver UI component, features and options to be used to print the particular electronic document. The information input by the user via the printer driver UI component is provided to an ad-hoc printing device manager.

In Step 2, the Ad-Hoc Printing Device Manager prompts the user, via the printer driver UI component, to establish an ad-hoc communications link between the mobile client device and the target ad-hoc printing device, for example, by pairing the mobile client device with the target ad-hoc printing device.

In Step 3, the user establishes an ad-hoc communications link between the mobile client device and the target ad-hoc printing device, for example, by pairing the mobile client device with the target ad-hoc printing device. After the ad-hoc communications link has been established, then in Step 4, the print server again queries the target ad-hoc printing device for ad-hoc printing device capability data that specifies the current features and options supported by the target ad-hoc printing device. This is performed because the features and options currently supported by the target ad-hoc printing device may have changed since the ad-hoc printing device capability data was previously acquired from the target ad-hoc printing device.

In Step 5, the print server determines whether any conflicts exist between the print job and the target ad-hoc printing device. According to one embodiment, the print server compares the features and options currently supported by the target ad-hoc printing device to the features and options specified in the print job ticket to determine whether any conflicts exist, i.e., whether the target ad-hoc printing device currently supports the features and options necessary to process the print job. If any conflicts exist, then the print server causes the printer driver UI component to display one or more GUI objects that allow the user to resolve the conflicts, for example, by changing one or more of the features and options to be used to print the print job. In Step 6, the user resolves any conflicts between the print job ticket and the features and options currently supported by the target ad-hoc printing device and processing of the print job continues.

In Step 7, the ad-hoc printing device manager supplies the un-rendered print data to the print rendering server for rendering. The un-rendered print data may include, for example, a print job ticket and electronic data to be printed. The print job ticket specifies the features and options that are to be used to print the electronic data on a particular target ad-hoc printing device. The print rendering server generates a rendered print job. The rendered print job includes PDL commands which, when processed by the target ad-hoc printing device, will cause the electronic document to be printed by the target ad-hoc printing device. In Step 8, the print rendering server supplies the rendered print job to the ad-hoc printing device manager, the ad-hoc printing device, or both the ad-hoc printing device manager and the ad-hoc printing device.

FIG. 9 is a flow diagram 900 that depicts a process for printing from a mobile client device to a printing device, according to an embodiment. In Step 902, a user specifies features and options for processing print job, for example, via a graphical user interface provided by a print driver. In step 904, the print driver loops through all the features and options selected by the user and, in step 906, validates the selected features and options. In step 908, a print job ticket is generated, for example, by the print driver.

In step 910, a determination is made whether more than one printing device currently supports the features and options specified in the print job ticket. This may include ad-hoc printing device and non-ad-hoc printing devices. If there is only one printing device that currently supports the features and options specified in the print job ticket, then in step 912, that printing device is selected as the target printing device. If in step 910 a determination is made that there is more one printing device that currently supports the features and options specified in the print job ticket, then in step 914, the printing device that best supports the features and options specified in the print job ticket is selected as the target printing device.

In step 916, a determination is made whether the target printing device is an ad-hoc printing device. If not, then in step 918, the print job ticket is sent to the rendering component. If, in step 916, a determination is made that the target printing device is an ad-hoc printing device, then in step 920, a determination is made whether the target ad-hoc printing device is connected, i.e., whether an ad-hoc communications link is established between the mobile client device and the target ad-hoc printing device. If not, then in step 922, the user is prompted to establish an ad-hoc communications link between the user's mobile client device and the ad-hoc printing device by, for example, pairing the user's mobile client device with the ad-hoc printing device.

If an ad-hoc communications link is established between the user's mobile client device and the ad-hoc printing device, then in step 924, the target ad-hoc printing device is queried to obtain the ad-hoc printing device capabilities data that specifies the features and options currently supported by the target ad-hoc printing device. In step 926, a determination is made whether the features and options specified by the ad-hoc printing device capabilities data conform to the print job ticket. This indicates whether the target ad-hoc printing device is currently capable of processing the print job. If so, then control proceeds to step 930 and the print job ticket is generated. If not, then control returns to step 928 where the user is given an opportunity to resolve any conflicting print ticket settings. In step 930, an un-rendered print job is supplied to a print rendering server for rendering. The un-rendered print job may include, for example, the print job ticket generated in step 930 and an electronic document, such as a word processing document, an email, a spreadsheet, a text file, or any other type of electronic data.

In step 934, a determination is made whether a user of the mobile client device is a registered user. This may be determined, for example, by sending a request to an authentication server with user credential data for the user, such as a user ID and password. If the user is not a registered user, then the print job is disregarded in step 936. This may include generating and transmitting one or more notifications, for example, to the mobile client device, an administrator, other designated recipients, etc. If the user is a registered user, then in step 938, the un-rendered print job is sent to a print rendering server for rendering and in step 940, the print rendering server renders the un-rendered print job and generates a rendered print job.

In step 942, the print rendering server sends the rendered print job to the ad-hoc printing device for processing. The ad-hoc printing device prints the rendered print job and in step 944, the ad-hoc printing device generates and sends a job status to the print rendering server. The ad-hoc printing device may, in addition to or instead of, sends the job status to the mobile client device. In step 946, the rendering server sends the job status to the mobile client device. For example, the print rendering server may send the print job status to the integrated printer driver on the mobile client device.

In addition to, or instead of, the print rendering server sending the rendered print job to the ad-hoc printing device in step 942, in step 948, the print rendering server may send the rendered print job to the mobile client device, for example to the integrated print driver on the mobile client device. In step 950, the mobile client device sends the rendered print data to the designated ad-hoc printing device. The ad-hoc printing device processed the rendered print data, prints the electronic document and in step 952, the ad-hoc printing device generates and sends a print job status to the mobile client device. For example, the ad-hoc printing device may send the print job status to the integrated printer driver on the mobile client device. The process is complete in step 954.

IX. Querying a New Printing Device

Figure 10:
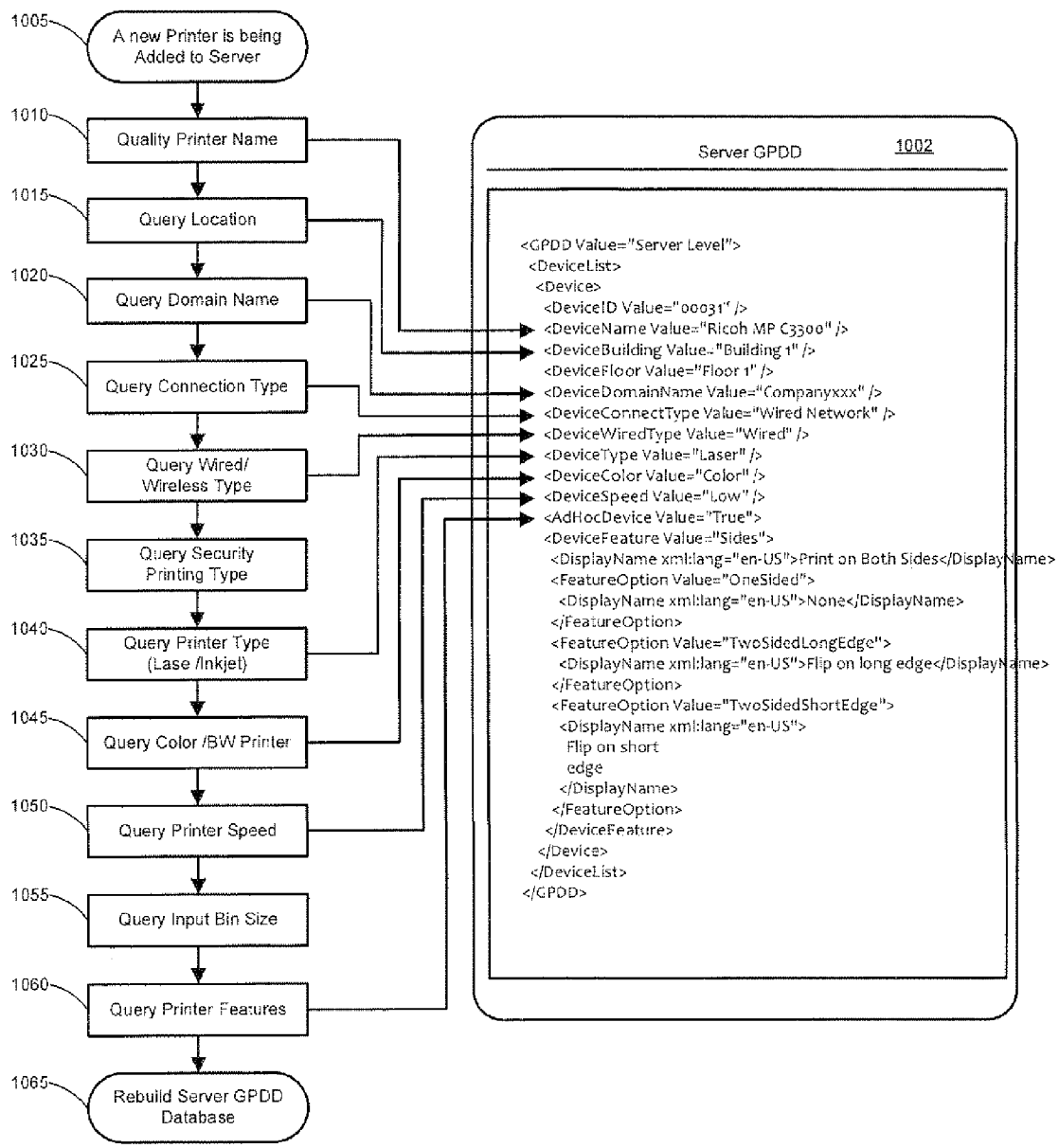
FIG. 10 includes a flow diagram and a block diagram that depict a process for querying a new printing device that is being added to a printer server.

FIG. 10 includes a flow diagram and a block diagram that depict a process 1000 for querying a new printing device that is being added to a printer server, such as print server 316, according to an embodiment.

At step 1005, a new printing device is added to a printer server. The new printing device may have been discovered automatically by the printer server or a network administrator might have informed the printer server about the new printing device, such as an IP or MAC address of the new printing device.

At step 1010, the printer server queries the new printing device for a name to be used for the printing device. As indicated in Server GPDD 1002, a name for the new printing device is "Ricoh MP C3300."

At step 1015, the printer server queries the new printing device for a location, such as building number and floor number. As indicated in Server GPDD 1002, the new printing device is on "Floor 1" of "Building 1."

At step 1020, the printer server queries the new printing device for a domain name. As indicated in Server GPDD 1002, the name of the domain of the new printing device is "Companyxxx."

At step 1025, the printer server queries the new printing device for a type of connection of the new printing device to the printer server. As indicated in Server GPDD 1002, the connection type is a wired network.

At step 1030, the printer server queries the new printing device for wired or wireless type. As indicated in Server GPDD 1002, the new printing device is wired.

At step 1035, the printer server queries the new printing device for a type of printing security supported by the new printing device. In this example, the security printing type is not reflected in Server GPDD 1002.

At step 1040, the printer server queries the new printing device for the device's type, such as whether the new printing device is a laser printer or an inkjet printer. As indicated in Server GPDD 1002, the new printing device is a laser printer.

At step 1045, the printer server queries the new printing device for whether the new printing device supports color or just black and white. As indicated in Server GPDD 1002, the new printing device is a color printer.

At step 1050, the printer server queries the new printing device for the printer's speed. As indicated in Server GPDD 1002, the new printing device is "Low." Other possible values for speed might be "High" or "Medium" or may be a metric that reflects a speed, such as "100 sheets per minute."

At step 1055, the printer server queries the new printing device for input bin size, which, in this example, is not reflected in Server GPDD 1002.

At step 1060, the printer server queries the new printing device for one or more printer features. As indicated in Server GPDD 1002, one feature of the new printing device is "Sides" whose display name is "Print on Both Sides." Also indicated in Server GPDD 1002 is the fact that the "Sides" feature has three options: "OneSided", "TwoSidedLongEdge", and "TwoSidedShortEdge". Each of the three options is associated with a corresponding display name, such as "None", "Flip on long edge" and "Flip on short edge".

At step 1065, the printer server builds (or rebuilds) Server GPDD 1002 to indicate the information that is retrieved in steps 1010-1060.

X. Data Flow Generic Printer Description Data

Figure 11:
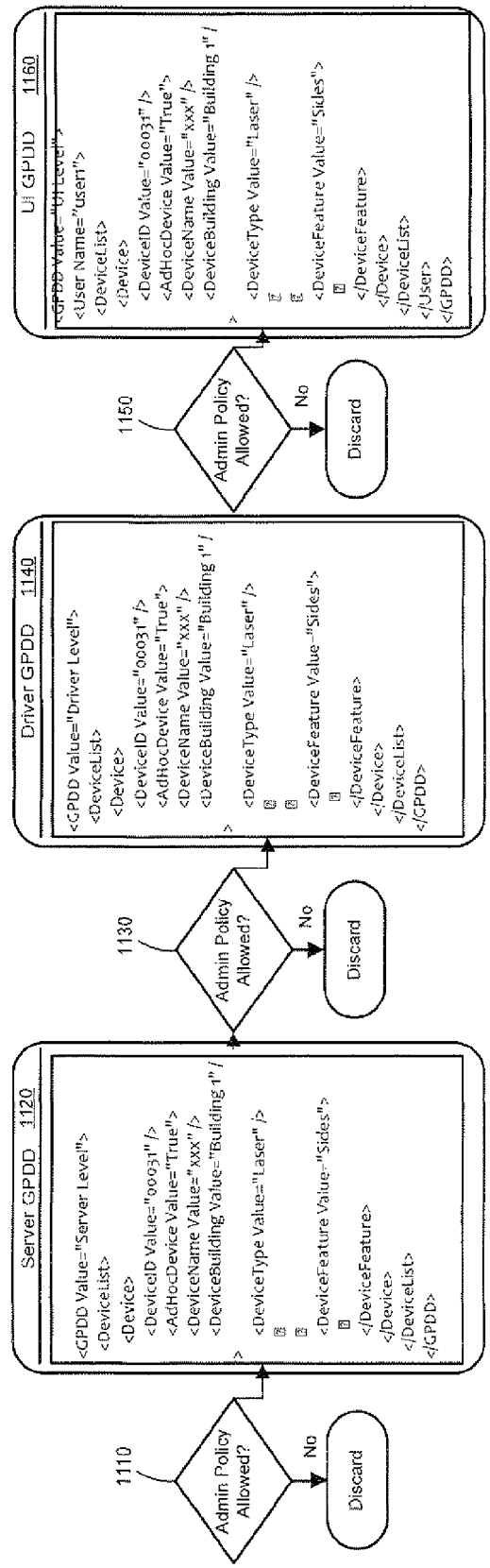
FIG. 11 is a block diagram that depicts a data flow of generic printer description data (GPDD) after querying a new printing device.

FIG. 11 is a block diagram that depicts a data flow 1100 of generic printer description data (GPDD) after querying a new printing device, according to an embodiment. After retrieving information about a new printing device (such as the information retrieved in steps 710-760 described above), a printer server (e.g., print server 316 in FIG. 3) performs a check 1110. Check 1110 involves determining whether an administrative policy allows the new printing device to be added to a Server GPDD 1120. This check may be performed prior to receiving all information about the new printing device, such as specific features and options. For example, after determining that a new printing device does not support any secured printing, then the printer server might not query the new printing device for information about supported features and options.

If check 1110 results in the negative, then information about the new printing device is discarded. If the check 1110 results in the affirmative, then information about the new printing device is added to Server GPDD 1120. As indicated in FIG. 11, Server GPDD 1120 includes a GPDD tag that indicates a GPDD value, which is "Server Level" indicating a server GPDD.

The printer server then performs check 1130, which involves determining whether an administrative policy allows the new printing device to be added to a Driver GPDD 1140, which corresponds to a particular user or a particular client device that is registered with the printer server. As indicated in FIG. 11, Driver GPDD 1140 includes a GPDD tag that indicates a GPDD value, which is "Driver Level" indicating a driver GPDD. If check 1130 results in the negative, then information about the new printing device is not added to Driver GPDD. If check 1130 results in the affirmative, then information about the new printing device is added to Driver GPDD 1140. As indicated in FIG. 11, Driver GPDD 1140 includes a GPDD tag that indicates a GPDD value, which is "Driver Level" indicating a driver GPDD.

The printer server may perform check 1130 for each user that is registered with the printer server or for each client device that is registered with the printer server and, optionally, that includes an integrated printer driver.

If check 1130 results in the affirmative, then the printer server sends the information about the new printing device to the client device that is associated with Driver GPDD 1140. The printer driver executing on that client device performs check 1150, which involves determining whether the new printing device is to be added to a list of available printing devices for the client device. If check 1150 results in the negative, then a UI GPDD on the client device is not updated. If check 1150 results in the affirmative, then the printer driver updates UI GPDD 1160 to include information about the new printing device. As indicated in FIG. 11, UI GPDD 1160 includes a GPDD tag that indicates a GPDD value, which is "UI Level" indicating a UI GPDD. Also, UI GPDD 1160 includes a user tag that indicates a name value, which is "user1" in this example.

XI. Multiple Versions of GPDD

Figure 12:
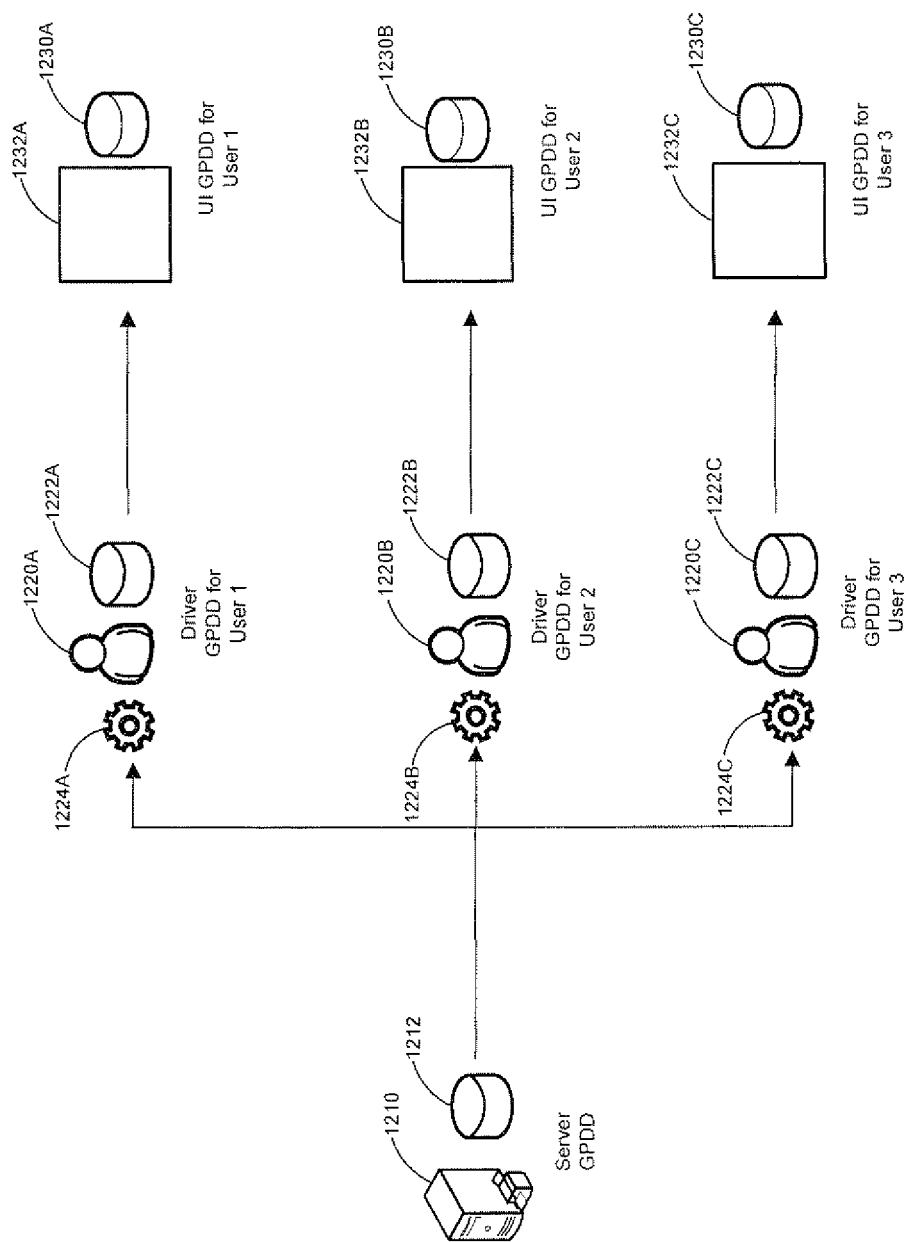
FIG. 12 is a block diagram that depicts multiple versions of generic printer description data in integrated feature selection printer drivers.

FIG. 12 is a block diagram that depicts multiple versions of generic printer description data in integrated feature selection printer drivers, according to an embodiment. FIG. 12 depicts a printer server 1210 and a Server GPDD database 1212. Printer server 1210 generates, based on Server GPDD in database 1212, a Driver GPDD and an integrated printer driver for each registered user 1220A-C. For example, Driver GPDD 1222A and integrated printer driver 1224A is generated for user 1220A; Driver GPDD 1222B and integrated printer driver 1224B is generated for user 1220B; and so forth. Each of Driver GPDD 1222A-C is a subset of the Server GPDD stored in database 1212.

Based on the Driver GPDD received at the corresponding client device, a printer driver generates a UI GPDD. For example, printer driver 1224A generates UI GPDD 1230A based on Driver GPDD 1222A, printer driver 1224B generates UI GPDD 1230B based on Driver GPDD 1222B, and so forth. Thus, each UI GPDD is a subset of its corresponding Driver GPDD.

From its UI GPDD, a printer driver generates a user interface on a display of a client device. For example, printer driver 1224A generates UI 1232A based on UI GPDD 1230A, printer driver 1224B generates UI 1232B based on UI GPDD 1230B, and so forth.

XII. Example GPDD

FIG. 13 is a block diagram that depicts example generic printer description data for each of a server, a driver, and a user interface, according to an embodiment. FIG. 13 depicts an example Server GPDD 1310, an example Driver GPDD 1320, and an example UI GPDD 1330. Although GPDDs 1310-1330 are in an XML format, embodiments of the invention are not limited to GPDDs in an XML format. Alternative formats are possible.

In this example, each of GPDDs 1310-1330 include the same information of a printing device, such as attributes of the printing device (e.g., name, location, connection type, device type, etc.) and capabilities data that includes options for the feature "Sides." Also, each of GPDDs 1310-1330 includes a different value for the GPDD Value. Specifically, Server GPDD 1310 indicates "Server level" as the value for the GPDD Value, Driver GPDD 1320 indicates "Driver level" as the value for the GPDD Value, and UI GPDD 1330 indicates "UI level" as the value for the GPDD Value.

XIII. Changing a Selection Filter Preference

Figure 14:
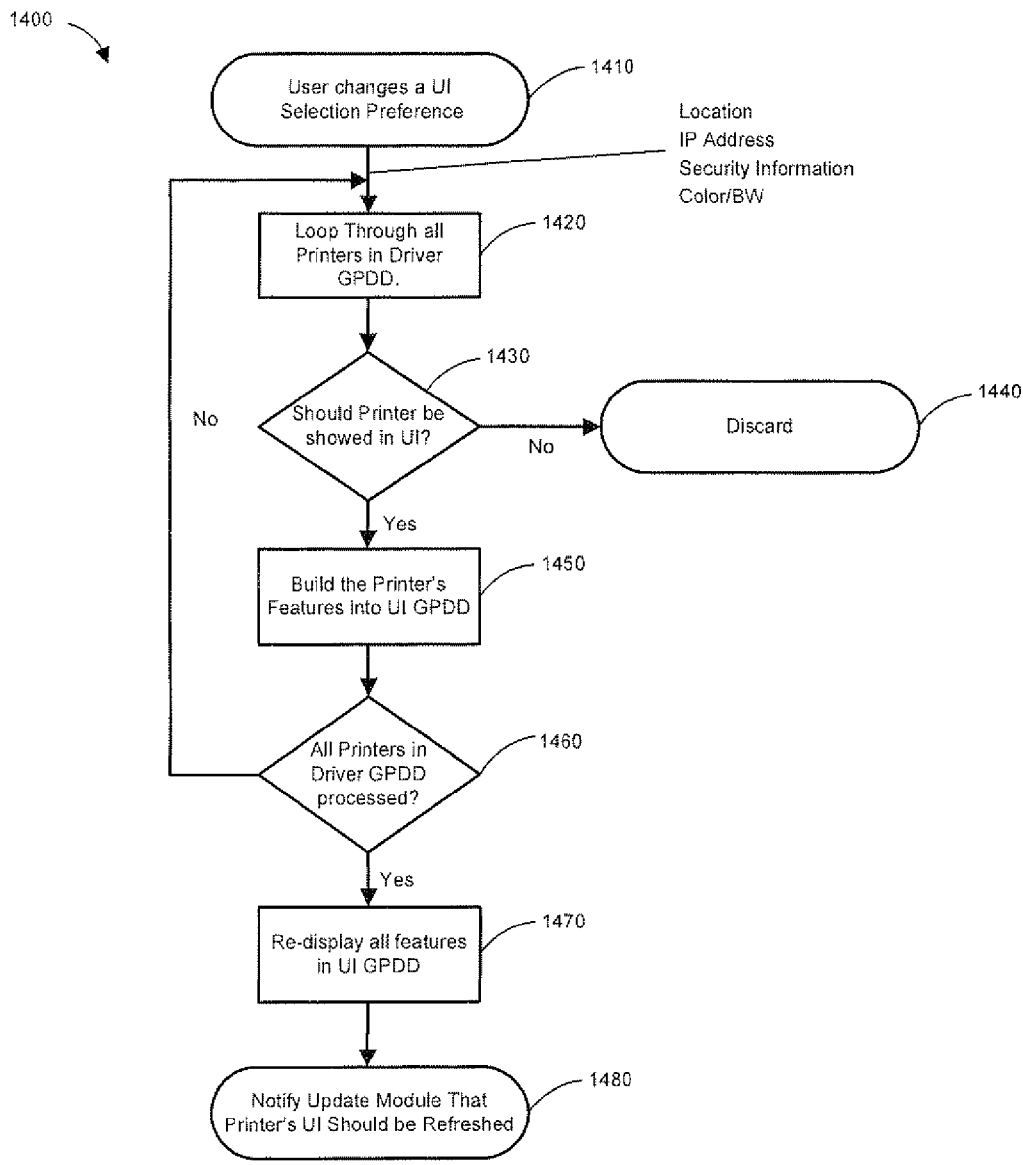
FIG. 14 is a flow diagram that depicts a process for a user changing a filter preference.

FIG. 14 is a flow diagram that depicts a process 1400 for a user changing a filter preference, according to an embodiment. Process 1400 may be performed by one or more components or modules of a printer driver, such as driver update module 334 depicted in FIG. 3.

At step 1410, a user changes a UI selection preference. Examples of UI selection preferences include, but are not limited to, location (e.g., building number or floor number), IP address (e.g., a specific subnet), security information, and color or black/white. The user might change the UI selection preference through a UI generated by a printer driver. As a result of performing step 1410, the printer driver might delete all UI GPDD and rebuild it using the following process. Alternatively, the printer driver might delete, from a UI GPDD one at a time, only information about a printing device that the printer driver determines should not be included in the UI GPDD based on the user's selection preference.

At step 1420, the printer driver identifies a printing device indicated in a Driver GPDD to which the printer driver has access. The Driver GPDD may be stored on the same client device that executes the printer driver.

At step 1430, the printer driver determines whether the printing device identified in step 1420 should be displayed in a user interface that a user uses to select features and options for a particular print job. This determination may be made by comparing the current set of selection preferences with attributes/characteristics of the identified printing device or by comparing just the changed preference with such attributes/characteristics. If step 1430 results in the negative, then process 1400 proceeds to step 1440, where information about the identified printing device is not included in (e.g., deleted from) the UI GPDD. If step 1430 results in the affirmative, then process 1400 proceeds to step 1450.

At step 1450, the printer driver adds the printing device's capabilities (i.e., features and options) into a UI GPDD, from which the printer driver eventually generates a user interface.

At step 1460, the printer driver determines whether information about each printing device indicated in the Driver GPDD has been analyzed. If not, then process 1400 proceeds to step 1420. Otherwise, process 1400 proceeds to step 1470.

At step 1470, the printer driver causes all (or many) features and options indicated in the updated UI GPDD to be re-displayed on the client. Only the features and options of printing devices that are identified in the UI GPDD are displayed. Thus, information about any printing devices that were not included in the UI GPDD in step 1450 is not displayed to a user of a client device that executes the printer driver.

At step 1480, one or more applications that are currently using this printer driver are notified, e.g., by the printer driver.

XIV. Changing UI Feature/Option

The selection of features and options under an integrated printer driver approach is different compared to other printer drivers. To support multiple devices in one user interface, the integrated printer driver should ensure that every feature set selection by a user is supported by at least one printing device. Constraints to features are applied according to device support by any devices. In other words, if none of the printing devices indicated in a UI GPDD supports a particular feature, then that particular feature appears disabled.

Figure 15:
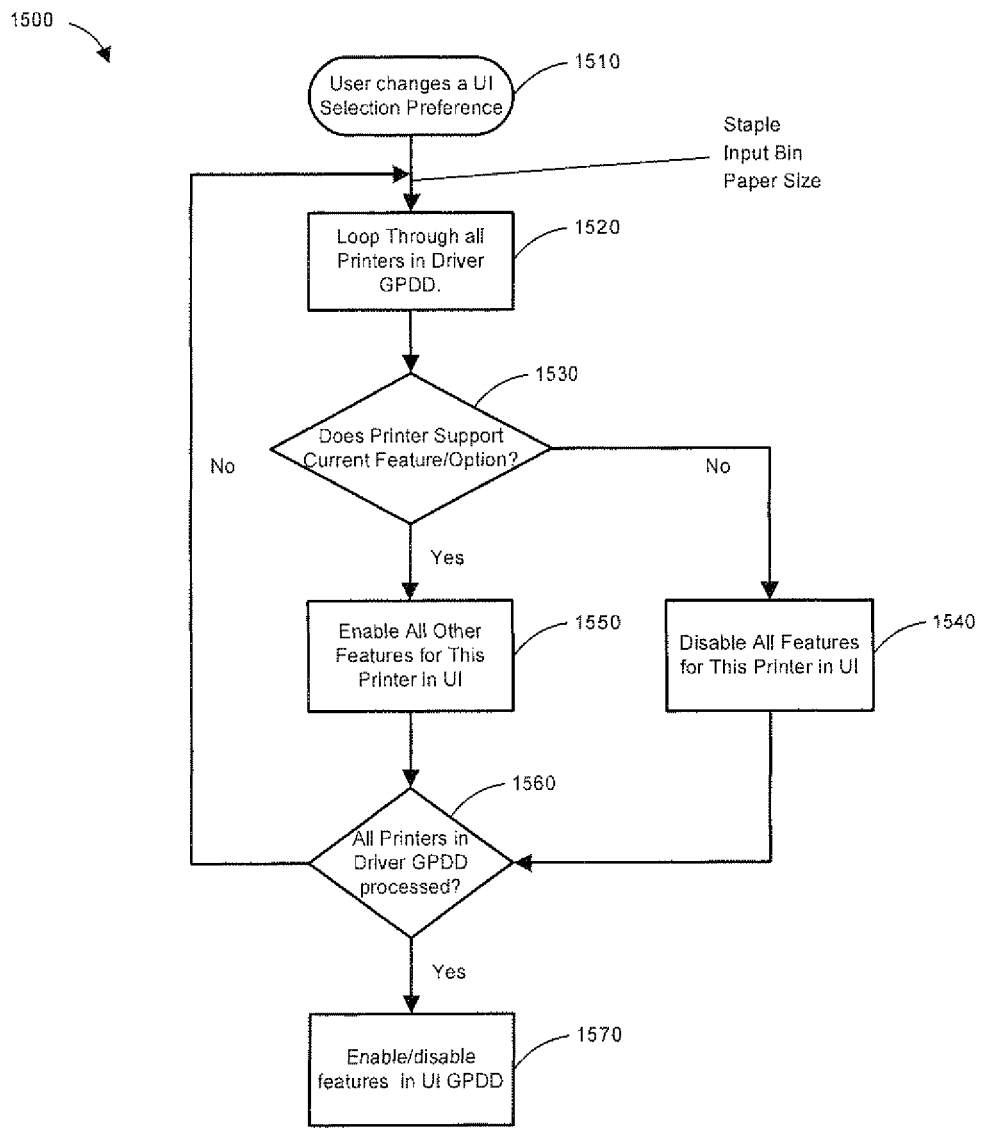
FIG. 15 is a flow diagram that depicts a process for a user changing a feature/option on a user interface (UI) of a printer driver.

FIG. 15 is a flow diagram that depicts a process 1500 for a user changing a feature/option on a user interface (UI) of a printer driver, according to an embodiment.

At step 1510, the UI receives, from a user, input that indicates a change in a feature or option. Examples of a change include changing the paper size from 8.5×11 to A4, or changing the input bin, or requiring stapling.

At step 1520, the printer driver identifies a printing device indicated in a Driver GPDD. If there is more than one printing device identified in the Driver GPDD, then the printer driver might "loop through" each identified printing device. In other words, steps 1520-1560 will be performed for each identified printing device.

At step 1530, the printer driver determines whether the printing device identified in step 1520 supports the feature/option selected in step 1510. If not, then process 1500 proceeds to step 1540. If so, then process 1500 proceeds to step 1550.

At step 1540, the printer driver disables all features of the printing device identified in step 1520 if the printing device does not support the feature/option set previously selected by user.

At step 1550, the printer driver enables all features for this printing device in the UI if the feature set previously selected by user is supported by the printing device.

At step 1560, the printer driver determines whether all printing devices have been identified in the Driver GPDD. If not, then process 1500 proceeds to step 1520 to identify another printing device. Otherwise, process 1500 proceeds to step 1570.

At step 1570, for each feature enabled/disabled in the UI, the printer driver enables or disables that feature in a UI GPDD. Thus, if feature 1 is enabled in the UI, then the printer driver enables feature 1 in the UI GPDD. Conversely, if feature 2 is disabled in the UI, then the printer driver disables feature 2 in the UI GPDD.

XV. Job Ticket Creation

Figure 16:
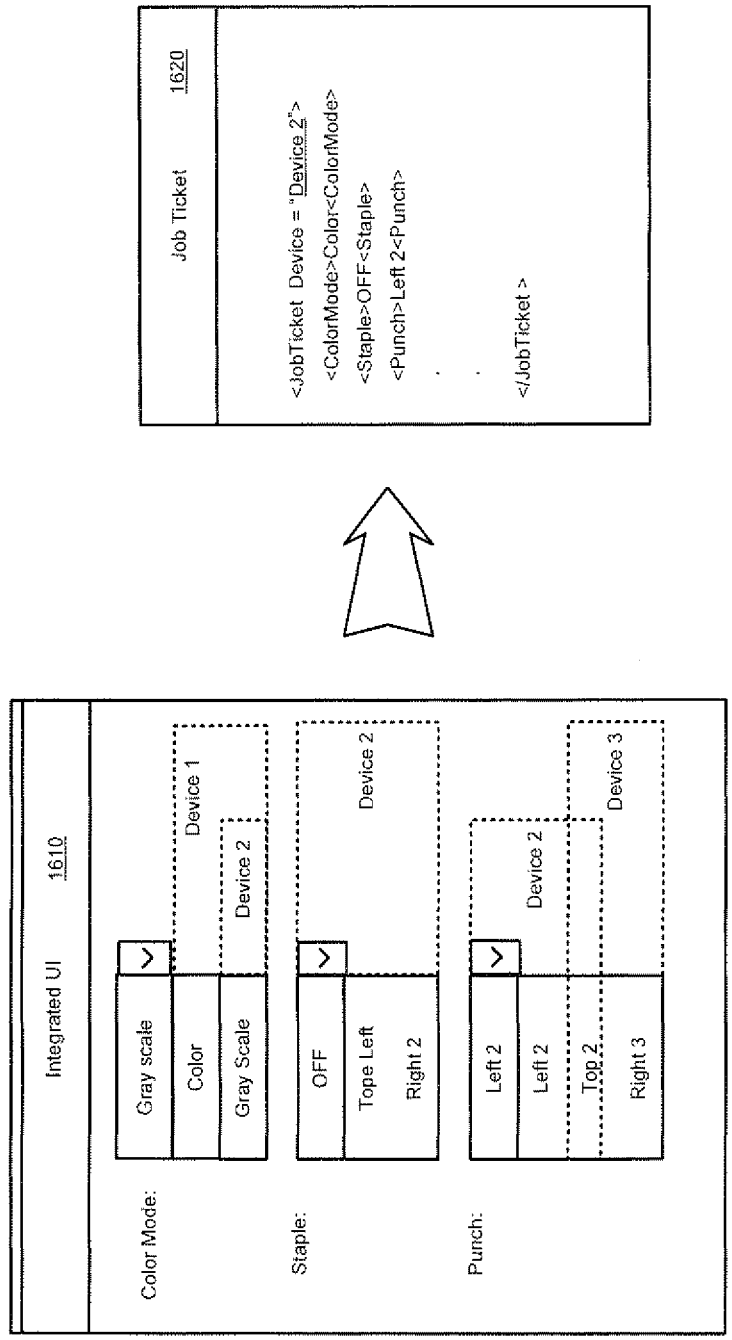
FIG. 16 is a block diagram that depicts a job ticket that is generated from an integrated user interface (UI).

FIG. 16 is a block diagram that depicts a job ticket 1620 that is generated from an integrated user interface (UI) 1610, according to an embodiment. Integrated UI 1610 is not necessarily what a user sees. Rather, integrated UI 1610 is a conceptual representation of different features and options that a user selected and of what printing devices support those features and options. For example, integrated UI 1610 indicates three features: Color Mode, Staple, and Punch. The options for Color Mode are "Color" and "Gray Scale" where "Gray Scale" is selected (whether affirmatively selected by a user or a default selection). The options for Staple are "OFF", "Top Left", and "Right 2" where "OFF" is selected. The options for Punch are "Left 2", "Top 2", and "Right 3" where "Left 2" is selected.

Integrated UI 1610 further indicates, for the "Color Mode" feature, that Printing Device 1 supports options "Color" and "Gray Scale" and that Printing Device 2 supports only the "Gray Scale" option. Integrated UI 1610 indicates that Printing Device 2 supports the "Staple" feature. For the "Punch" feature, integrated UI 1610 indicates that Printing Device 2 supports options "Left 2" and "Top 2" and that Printing Device 3 supports options "Top 2" and "Right 3."

As indicated in integrated UI 1610, only Printing Device 2 supports all the selected features and options. Based on the options and features selected, the printer driver generates job ticket 1620. In this example, job ticket 1620 is an XML file that includes an element or tag for each selected feature where the root element identifies a printing device. In this example, the value of the attribute "Device" in the "Job Ticket" element is "Device 2", referring to Printing Device 2. The resulting print job will thus be sent to Printing Device 2. Also, there are three elements: "ColorMode", "Staple", and "Punch."

The value of each element indicates the selected option for the corresponding feature. In this example, the value of the "ColorMode" element is "Gray Scale", the value of the "Staple" element is "OFF", and the value of the "Punch" element is "Left 2".

XVI. Printer Selection Preference Menu

Figure 17:
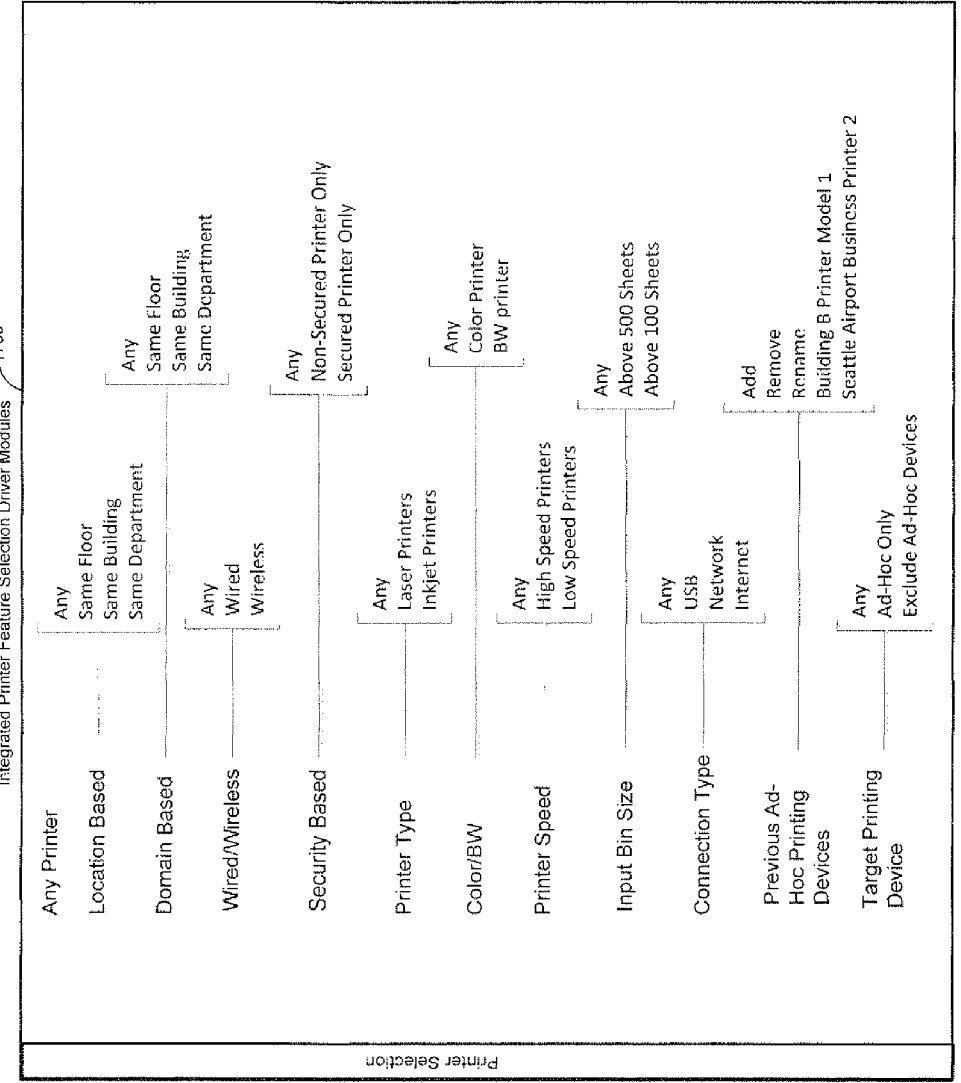
FIG. 17 is a block diagram that depicts a printer selection preference menu.

FIG. 17 is a block diagram that depicts a printer selection preference menu structure 1700, according to an embodiment. A printer driver (e.g., integrated printer driver 128) might generate a display that is based on selections of one or more preferences indicated in menu structure 1700. Menu structure 1700 indicates possible attributes or characteristics of printing devices. Menu 1700 structure allows a user to select different attributes that a set of target printing devices must have in order to be a candidate printing device to process future print jobs.

In this example, menu structure 1700 indicates possible locations of a printing device, possible domains of a printing device, whether a printing device is wired or wireless, whether a printing device is secured or not, whether a printing device is a laser or inkjet printer, whether a printing device supports color or just black and white, whether the printing device is a high speed or a low speed printer, whether a printing device supports an input bin size of 500 sheets or just 100 sheets, possible connection types of a printing device, manage previous ad-hoc printing devices, or a target printing device. Initially, menu structure 1700 might include default selections, such as "Any" for each attribute/preference. Once a user is finished making any selections, the final set of selected attributes/preferences are used to determine which printing devices may be used to process print jobs. A printer driver might use the selections to build (or rebuild) a UI GPDD that indicates a set of features and options that are supported by printing devices that satisfy the preference selections indicated in menu structure 1700. A UI component of the printer driver might generate a user interface based on the UI GPDD.

XVII. Example Printer Driver User Interface

Figure 18:
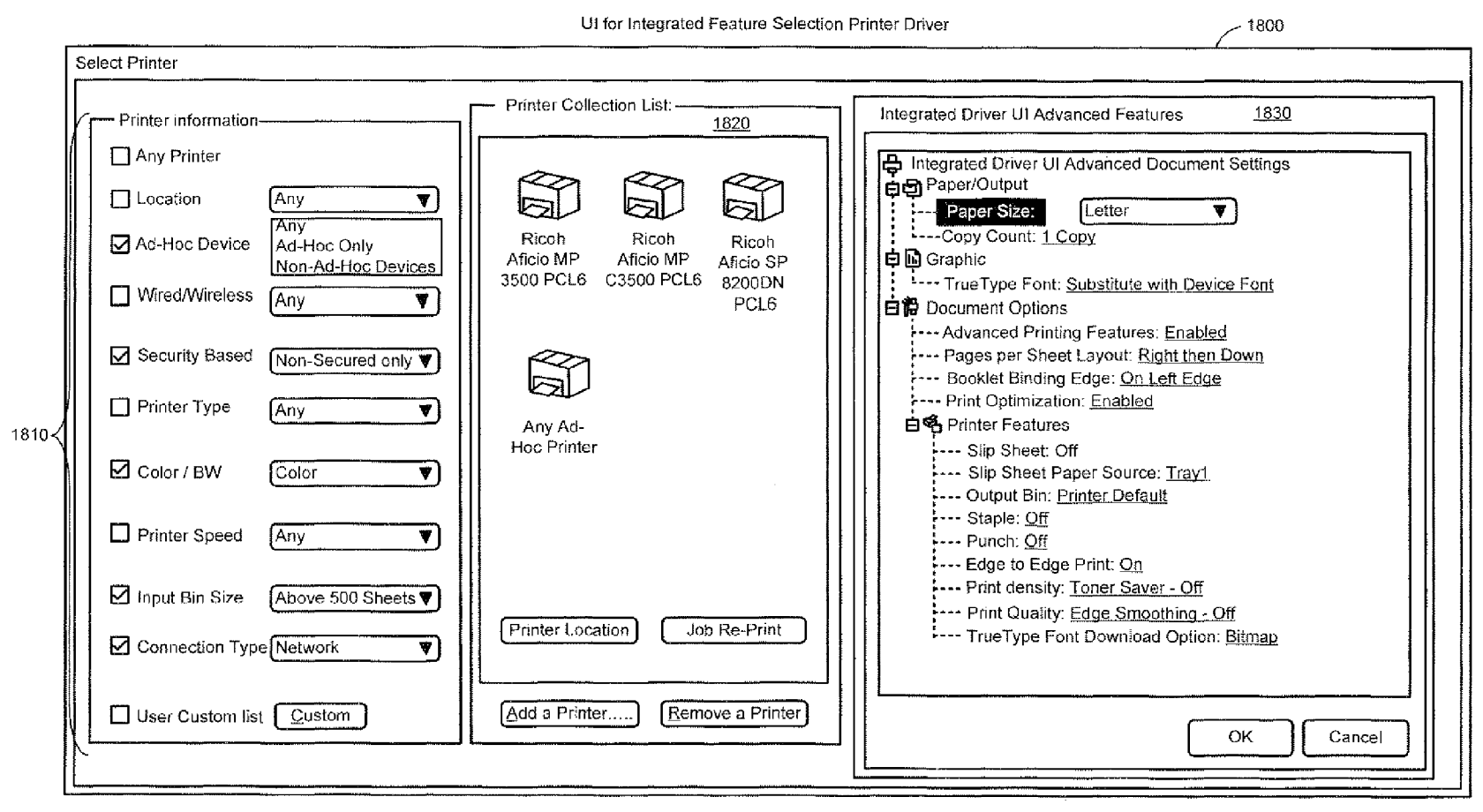

FIG. 18 is a block diagram that depicts an example user interface 1800, according to an embodiment. User interface 1800 may be generated by a UI module of a printer driver. The data used to populate user interface 1800 may originate from a UI GPDD.

User interface 1800 comprises three parts or regions: printer selection filter preference 1810, a printer collection list 1820, and a printer feature/option list 1830.

Printer selection filter preference 1810 defines printer preferences (e.g., those indicated in menu 1100) that are used to exclude some printers that a user does not intend to print upon. For example, a user may select Color/BW as a filter, and define only Black/White printers as possible destination devices. In the depicted example, the printer preferences are that the printing device must be non-secured, the printing device must support color printing, that the input bin size must be greater than 500 sheets, and the connection type is network.

Printer collection list 1820 lists one or more (or all) printing devices that are within a set of possible destination printing devices after the user's preferences are defined in printer selection filter preference 1810. In the depicted example, three printing devices are in printer collection list 1820: Ricoh Aficio MP 3500 PCL6, Ricoh Aficio MP C3500 PCL6, and Ricoh Aficio SP 8200DN PCL6. Also depicted is an icon that corresponds to any ad-hoc printer. Printer collection list 1820 includes a "Printer Location" control for sorting or selecting printers based upon location (physical or logical) and a "Job Re-Print" control for re-printing print jobs that have previously been processed. Selecting the "Job Re-Print" control causes to be displayed a list of one or more ad-hoc printing devices previously used by the user. Information for each ad-hoc printing device may also be displayed, such as location, model, status information, etc. The user may select one of the listed ad-hoc printing devices as a target ad-hoc printing device for the next print job. A "Add a Printer" control is provided for adding printing devices to the printer collection list 1820 and a "Remove a Printer" control is provided for removing printing devices from the printer collection list 1820.

Printer feature/option list 1830 lists multiple (or all) features and options supported by a set of one or more printing devices that are determined based on a set of selection preferences selected by a user (and/or by default). In an embodiment, each time a user changes a feature or option from printer feature/option list 1820, the resulting set of features is validated by a printer driver against the capabilities of potential printing devices (e.g., those indicated in a Driver GPDD). If a printing device does not support the resulting set of features, then all of that printing device's features are disabled in printer feature/option list 1830. However, if there is a printing device that does support the resulting set of features, then all of that printing device's features are enabled in printer feature/option list 1830.

In this example, printer feature/option list 1830 divides printer features into three main types: Paper/Output, Graphic, and Document Options, which include the majority of the printer features, such as Slip Sheet, Output Bin, Staple, Punch, Edge to Edge Print, Print Density, and Print Quality.

XVIII. Establishing an Ad-Hoc Communications Link

Figure 19:
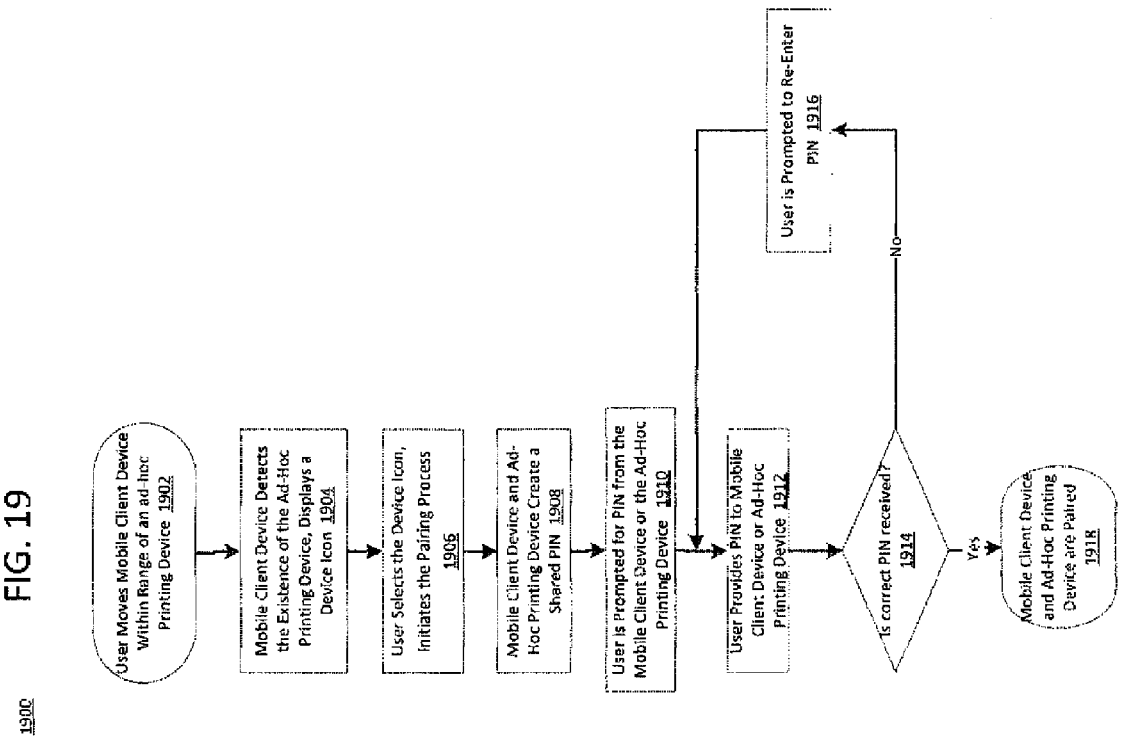
FIG. 19 is a flow diagram that depicts a process for establishing an ad-hoc communications link between a mobile client device and an ad-hoc printing device.

FIG. 19 is a flow diagram 1900 that depicts a process for establishing an ad-hoc communications link between a mobile client device and an ad-hoc printing device. In step 1902, a user moves a client device within range of an ad-hoc printing device. The range may vary depending upon the particular type of ad-hoc communications that are supported by the mobile client device and the ad-hoc printing device.

In step 1904, the mobile client device detects the existence of the ad-hoc printing device and displays a device icon on the mobile client device to provide a visual indication to the user. In step 1906, the user selects the device icon to initiate a pairing process between the mobile client device and the ad-hoc printing device.

In step 1908, the mobile client device and the ad-hoc printing device create shared information that will be used to establish the ad-hoc communications link. In the present example, the mobile client device and the ad-hoc printing device create a shared PIN. In step 1910, the user in queried for the shared information via the mobile client device or the ad-hoc printing device. For example, a message may be displayed on a user interface of the mobile client device requesting that the user enter the PIN. In step 1912, the user provides the PIN to the mobile client device or the ad-hoc printing device. In the present example, the user is queried for the shared PIN. In step 1914, a determination is made whether the correct PIN was received at either the mobile client device or the ad-hoc printing device. If not, then in step 1916, the user is prompted to re-enter the PIN. If the correct PIN was entered, then the pairing process is completed in step 1918.

XIX. Re-Printing Print Jobs and Locating Ad-Hoc Printing Devices

Figure 20:
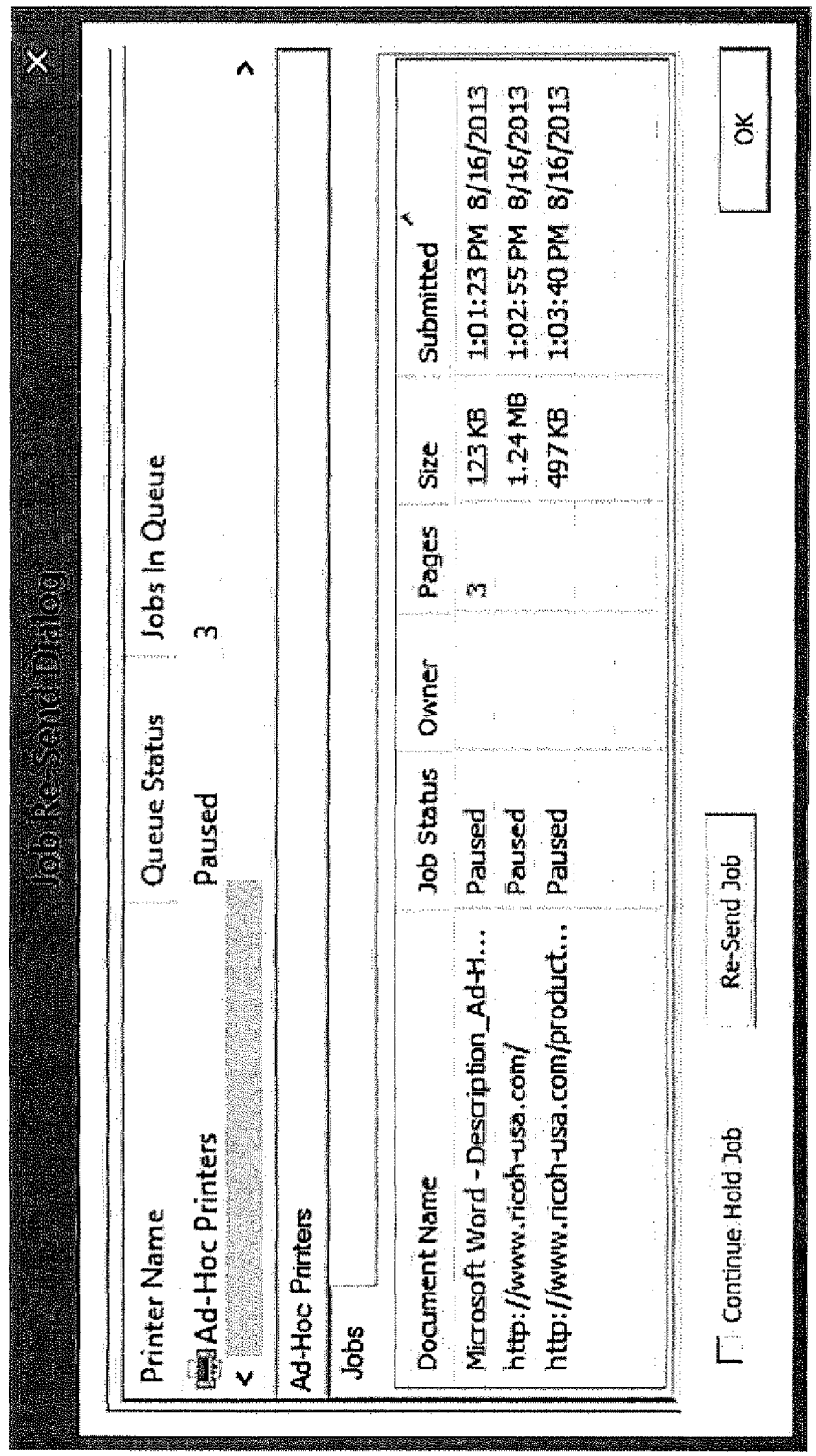
FIG. 20 is a block diagram that depicts an example user interface screen, in the form of a Job Re-Send Dialog box, that allows a user to re-print print jobs.

FIG. 20 is a block diagram that depicts an example user interface screen 2000, in the form of a Job Re-Send Dialog box, that allows a user to re-print print jobs. The user interface screen 2000 depicts a set of three print jobs being held by a mobile client device. A user may select one or more of the available print jobs and specify that the selected print jobs should continue to be held or re-submitted to the ad-hoc printing device. Print jobs selected for re-sending are submitted to a print rendering server for rendering and transmission to a specified ad-hoc printing device.

Figure 21:
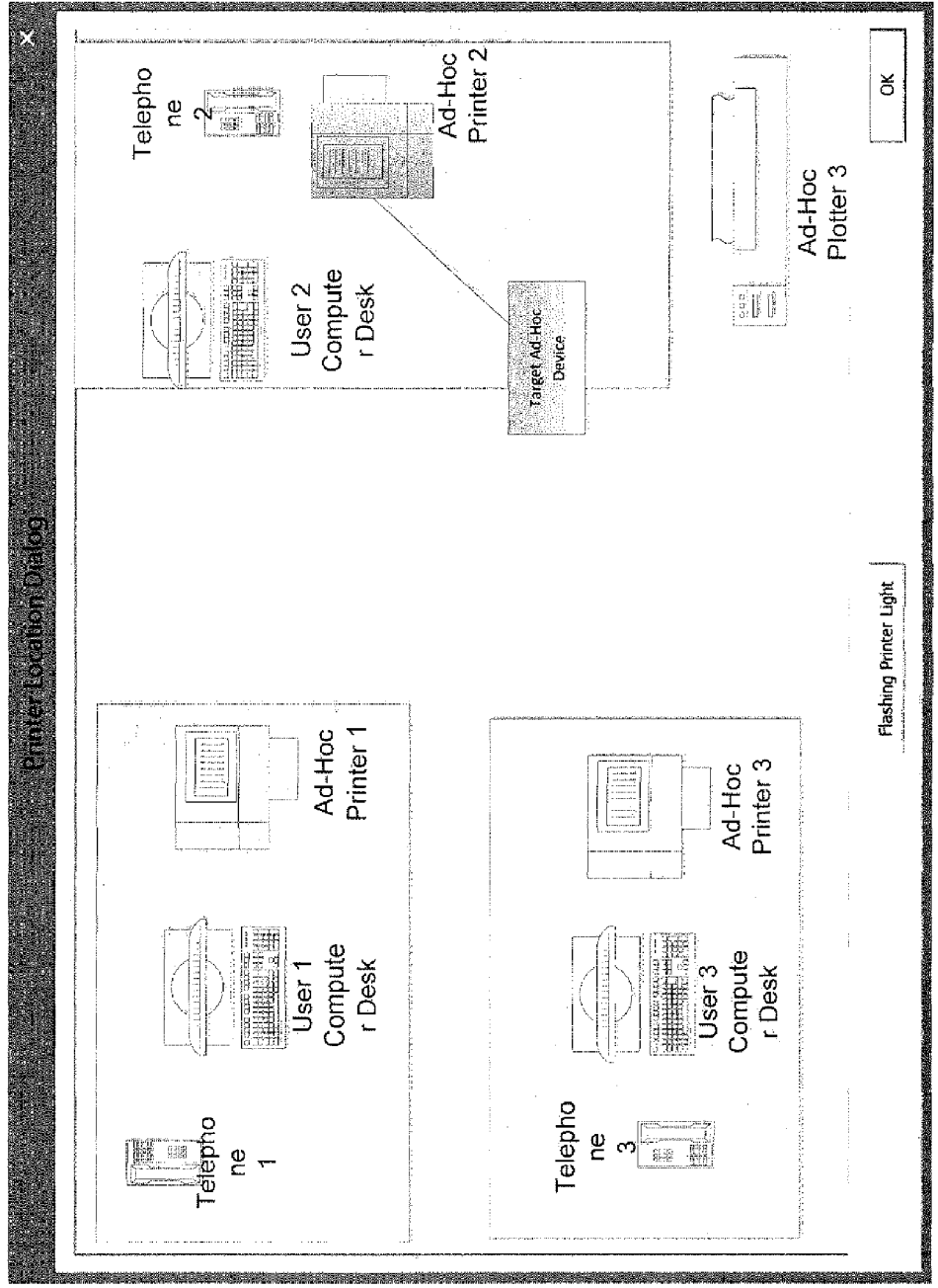
FIG. 21 is a block diagram that depicts an example user interface screen for locating ad-hoc printing devices.

To assist the user in finding or locating the ac-hoc printing device, the printer driver UI allows the use of additional modules ("Plug-ins") to show the location of ad-hoc printing devices within local environments, such as a local building, office, or campus etc. FIG. 21 is a block diagram that depicts an example user interface screen 2100 for locating ad-hoc printing devices. The user interface screen 2100 depicts a set of ad-hoc printing devices that are available for printing and also depicts the locations of those available ad-hoc printing devices. For example, the ad-hoc printer named "Ad-Hoc Printer 1" is depicted adjacent the telephone named "Telephone 1" and the "User 1 Computer Desk". The locations of available ad-hoc printing devices may be specified in a map, for example, by an administrator. Alternatively, the locations of available ad-hoc printing devices may be determined using location information provided, for example, via GPS, RFID tags, etc. An ad-hoc printing device that has been selected for printing may be conspicuously identified, for example, as indicated in user interface screen 2100 by the indicator "Target Ad-Hoc Device". A control "Flashing Printer Light" is provided to actuate one or more lights on an available ad-hoc printing device to aid a user in locating a particular ad-hoc printing device.

Figure 22:
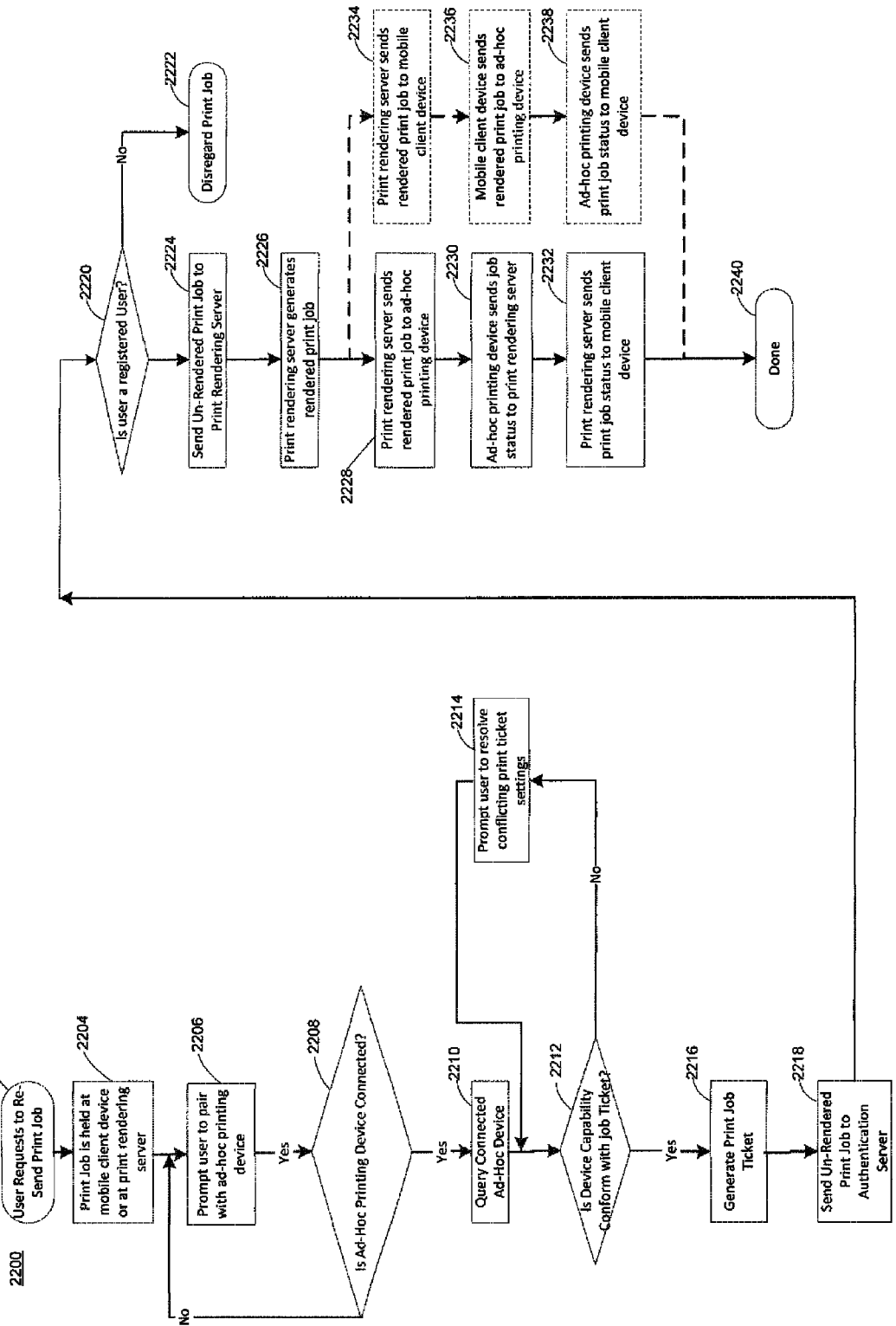
FIG. 22 is a flow diagram that depicts a process for re-printing a print job.

FIG. 22 is a flow diagram 2200 that depicts a process for re-printing a print job. In Step 2202, a user requests to re-send a print job. In step 2204, the print job is stored at a mobile client device or at a print rendering server and a graphical user interface may indicate the available print jobs and their locations, as previously described herein. In step 2006, a user is prompted to establish an ad-hoc communications link between the user's mobile client device and the ad-hoc printing device by, for example, pairing the user's mobile client device with the ad-hoc printing device. In step 2008, a determination is made whether the user's mobile client device has been paired with an ad-hoc printing device. If not, then control returns to step 2206 and the user is again prompted to pair the user's mobile client device with an ad-hoc printing device. If an ad-hoc communications link is established between the user's mobile client device and the ad-hoc printing device, then in step 2210, the target ad-hoc printing device is queried to obtain the ad-hoc printing device capabilities data that specifies the features and options currently supported by the target ad-hoc printing device. In step 2212, a determination is made whether the features and options specified by the ad-hoc printing device capabilities data conform to the print job ticket. This indicates whether the target ad-hoc printing device is currently capable of processing the print job. If not, then control returns to step 2214 where the user is given an opportunity to resolve any conflicting print ticket settings. If so, then control proceeds to step 2216 and the print job ticket is generated. In step 2218, an un-rendered print job is supplied to an authentication server for authentication. The un-rendered print job may include, for example, the print job ticket generated in step 2216 and an electronic document, such as a word processing document, an email, a spreadsheet, a text file, or any other type of electronic data.

In step 2220, a determination is made whether a user of the mobile client device is a registered user. This may be determined, for example, by sending a request to an authentication server with user credential data for the user, such as a user ID and password. If the user is not a registered user, then the print job is disregarded in step 2222. This may include generating and transmitting one or more notifications, for example, to the mobile client device, an administrator, other designated recipients, etc. If the user is a registered user, then in step 2224, the un-rendered print job is sent to a print rendering server for rendering and in step 2226, the print rendering server renders the un-rendered print job and generates a rendered print job.

In step 2228, the print rendering server sends the rendered print job to the ad-hoc printing device for processing. The ad-hoc printing device prints the rendered print job and in step 2230, the ad-hoc printing device generates and sends a job status to the print rendering server. The ad-hoc printing device may, in addition to or instead of, sends the job status to the mobile client device. In step 2232, the rendering server sends the job status to the mobile client device. For example, the print rendering server may send the print job status to the integrated printer driver on the mobile client device.

In addition to, or instead of, the print rendering server sending the rendered print job to the ad-hoc printing device in step 2228, in step 2234, the print rendering server may send the rendered print job to the mobile client device, for example to the integrated print driver on the mobile client device. In step 2236, the mobile client device sends the rendered print data to the designated ad-hoc printing device. The ad-hoc printing device processed the rendered print data, prints the electronic document and in step 2238, the ad-hoc printing device generates and sends a print job status to the mobile client device. For example, the ad-hoc printing device may send the print job status to the integrated printer driver on the mobile client device. The process is complete in step 2240.

XX. Implementation Mechanisms

Managing network device configuration data by functional area as described herein is very user friendly and less prone to errors than prior approaches. Users are informed of their progress on the GUI as each functional area of configuration data is updated and then implemented on a network device. The approach also reduces bandwidth consumption by allowing only data that has been updated to be supplied to a network device. The bulk management features simplify and expedite the editing of existing configuration data and the creation of new configuration data.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 23:
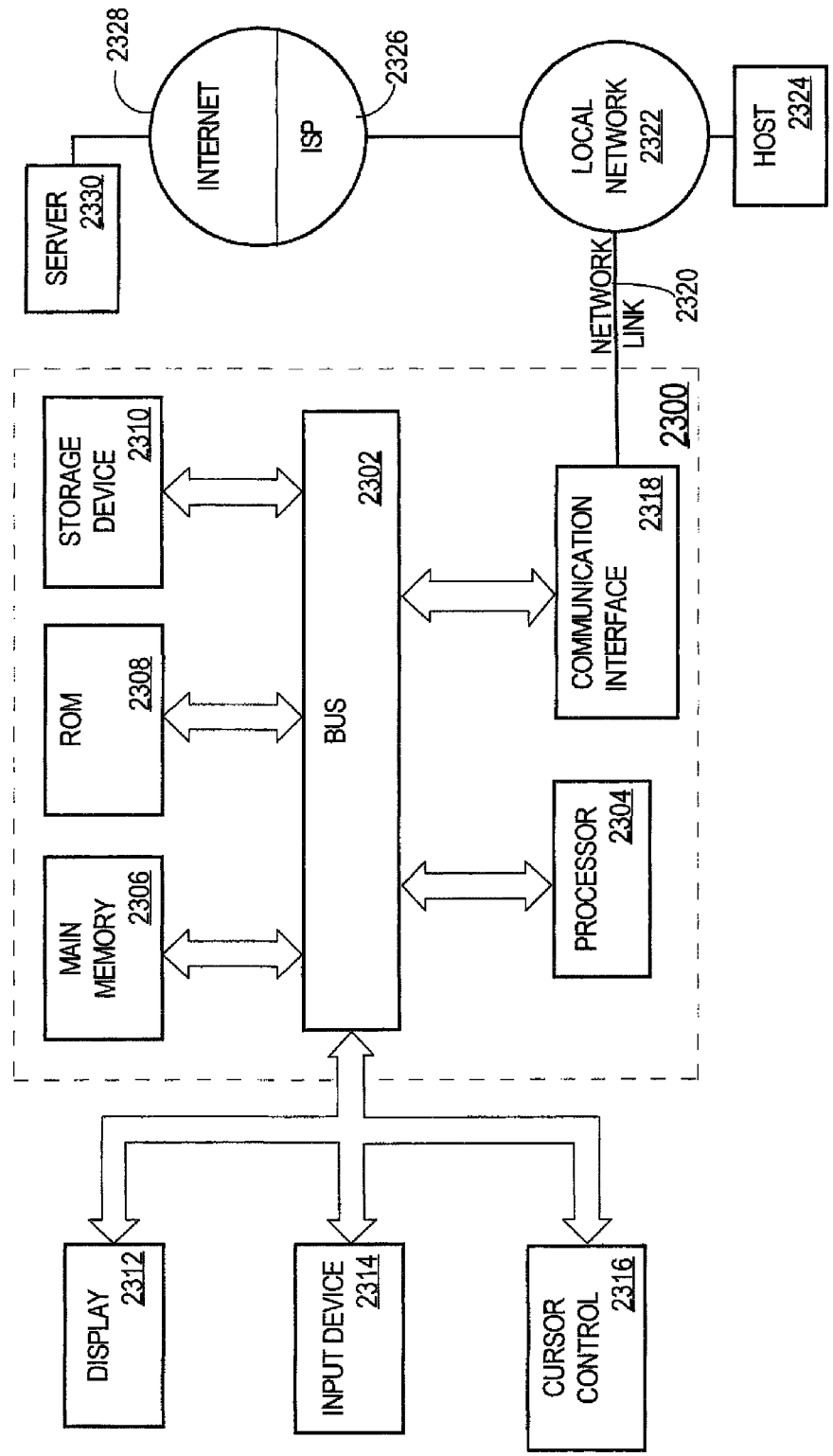
FIG. 23 is a block diagram that illustrates a computer system upon which an embodiment of the invention may be implemented.

FIG. 23 is a block diagram that depicts an example computer system 2300 upon which embodiments may be implemented. Computer system 2300 includes a bus 2302 or other communication mechanism for communicating information, and a processor 2304 coupled with bus 2302 for processing information. Computer system 2300 also includes a main memory 2306, such as a random access memory (RAM) or other dynamic storage device, coupled to bus 2302 for storing information and instructions to be executed by processor 2304. Main memory 2306 also may be used for storing temporary variables or other intermediate information during execution of instructions to be executed by processor 2304. Computer system 2300 further includes a read only memory (ROM) 2308 or other static storage device coupled to bus 2302 for storing static information and instructions for processor 2304. A storage device 2310, such as a magnetic disk or optical disk, is provided and coupled to bus 2302 for storing information and instructions.

Computer system 2300 may be coupled via bus 2302 to a display 2312, such as a cathode ray tube (CRT), for displaying information to a computer user. Although bus 2302 is illustrated as a single bus, bus 2302 may comprise one or more buses. For example, bus 2302 may include without limitation a control bus by which processor 2304 controls other devices within computer system 2300, an address bus by which processor 2304 specifies memory locations of instructions for execution, or any other type of bus for transferring data or signals between components of computer system 2300.

An input device 2314, including alphanumeric and other keys, is coupled to bus 2302 for communicating information and command selections to processor 2304. Another type of user input device is cursor control 2316, such as a mouse, a trackball, or cursor direction keys for communicating direction information and command selections to processor 2304 and for controlling cursor movement on display 2312. This input device typically has two degrees of freedom in two axes, a first axis (e.g., x) and a second axis (e.g., y), that allows the device to specify positions in a plane.

Computer system 2300 may implement the techniques described herein using customized hard-wired logic, one or more ASICs or FPGAs, firmware and/or program logic or computer software which, in combination with the computer system, causes or programs computer system 2300 to be a special-purpose machine. According to one embodiment, those techniques are performed by computer system 2300 in response to processor 2304 executing one or more sequences of one or more instructions contained in main memory 2306. Such instructions may be read into main memory 2306 from another computer-readable medium, such as storage device 2310. Execution of the sequences of instructions contained in main memory 2306 causes processor 2304 to perform the process steps described herein. In alternative embodiments, hard-wired circuitry may be used in place of or in combination with software instructions to implement the embodiments. Thus, embodiments are not limited to any specific combination of hardware circuitry and software.

The term "computer-readable medium" as used herein refers to any medium that participates in providing data that causes a computer to operate in a specific manner. In an embodiment implemented using computer system 2300, various computer-readable media are involved, for example, in providing instructions to processor 2304 for execution. Such a medium may take many forms, including but not limited to, non-volatile media and volatile media. Non-volatile media includes, for example, optical or magnetic disks, such as storage device 2310. Volatile media includes dynamic memory, such as main memory 2306. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 2304 for execution. For example, the instructions may initially be carried on a magnetic disk of a remote computer. The remote computer can load the instructions into its dynamic memory and send the instructions over a telephone line using a modem. A modem local to computer system 2300 can receive the data on the telephone line and use an infra-red transmitter to convert the data to an infra-red signal. An infra-red detector can receive the data carried in the infra-red signal and appropriate circuitry can place the data on bus 2302. Bus 2302 carries the data to main memory 2306, from which processor 2304 retrieves and executes the instructions. The instructions received by main memory 2306 may optionally be stored on storage device 2310 either before or after execution by processor 2304.

Computer system 2300 also includes a communication interface 2318 coupled to bus 2302. Communication interface 2318 provides a two-way data communication coupling to a network link 2320 that is connected to a local network 2322. For example, communication interface 2318 may be an integrated services digital network (ISDN) card or a modem to provide a data communication connection to a corresponding type of telephone line. As another example, communication interface 2318 may be a local area network (LAN) card to provide a data communication connection to a compatible LAN. Wireless links may also be implemented. In any such implementation, communication interface 2318 sends and receives electrical, electromagnetic or optical signals that carry digital data streams representing various types of information.

Network link 2320 typically provides data communication through one or more networks to other data devices. For example, network link 2320 may provide a connection through local network 2322 to a host computer 2324 or to data equipment operated by an Internet Service Provider (ISP) 2326. ISP 2326 in turn provides data communication services through the world wide packet data communication network now commonly referred to as the "Internet" 2328. Local network 2322 and Internet 2328 both use electrical, electromagnetic or optical signals that carry digital data streams.

Computer system 2300 can send messages and receive data, including program code, through the network(s), network link 2320 and communication interface 2318. In the Internet example, a server 2330 might transmit a requested code for an application program through Internet 2328, ISP 2326, local network 2322 and communication interface 2318. The received code may be executed by processor 2304 as it is received, and/or stored in storage device 2310, or other non-volatile storage for later execution.

In the foregoing specification, embodiments have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. One or more non-transitory computer-readable media storing instructions which, when processed by one or more processors, cause:

prior to an ad-hoc wireless communications link being established between a mobile client device and a particular ad-hoc printing device, at the mobile client device, generating an un-rendered print job; and after the ad-hoc wireless communications link is established between the mobile client device and the particular ad-hoc printing device:

determining, at the mobile client device, whether the un-rendered print job is compatible with the particular ad-hoc printing device, in response to determining, at the mobile client device, that the un-rendered print job is compatible with the particular ad-hoc printing device, then causing the un-rendered print job to be transmitted via one or more communications links from the mobile client device to a print rendering server that is separate from the mobile client device for rendering, and in response to determining, at the mobile client device, that the un-rendered print job is not compatible with the particular ad-hoc printing device, then generating, at the mobile client device, an updated un-rendered print job by resolving one or more incompatibilities between the un-rendered print job and the particular ad-hoc printing device, and causing, at the mobile client device, the updated un-rendered print job to be transmitted via the one or more communications links from the mobile client device to the print rendering server that is separate from the mobile client device for rendering, at the mobile client device, after establishing a new ad-hoc wireless communications link with the particular ad-hoc printing device and prior to causing the un-rendered print job to again be transmitted to the print rendering server, determining whether one or more features and options for the un-rendered print job are currently supported by the particular ad-hoc printing device;

at the mobile client device, after establishing an ad-hoc wireless communications link with an other ad-hoc printing device that is different than the particular ad-hoc printing device and prior to causing the un-rendered print job to be transmitted to the print rendering server, determining whether one or more features and options for the un-rendered print job are currently supported by the other ad-hoc printing device;

at the mobile client device, generating an authentication request to request authentication of a user of the mobile client device;

at the mobile client device, transmitting the authentication request via the one or more communications links to an authentication server;

at the mobile client device, receiving an authentication response via the one or more communications links from the authentication server;

determining, at the mobile client device, whether the authentication response indicates that the user of the mobile client device has been successfully authenticated; and wherein causing the un-rendered print job to be transmitted via the one or more communications links from the mobile client device to the print rendering server that is separate from the mobile client device for rendering is performed in response to determining, at the mobile client device, that the user of the mobile client device has been successfully authenticated.

2. The one or more non-transitory computer-readable media of claim 1, wherein:

the un-rendered print job includes a print job ticket and an electronic document, and the one or more non-transitory computer-readable media further store additional instructions which, when processed by the one or more processors, cause:

at the mobile client device, receiving via the one or more communications links from the print rendering server, a rendered print job that is a rendered version of the un-rendered print job and includes printer description language data; and at the mobile client device, transmitting the rendered print job to the particular ad-hoc printing device.

3. The one or more non-transitory computer-readable media of claim 1, further storing additional instructions which, when processed by the one or more processors, cause:

at the mobile client device, displaying via a user interface of the mobile client device, one or more graphical user interface objects that allow a user of the mobile client device to request an attempt to establish a new ad-hoc wireless communications link with the particular ad-hoc printing device or to request an attempt to establish an ad-hoc wireless communications link with the other ad-hoc wireless communications device.

4. The one or more non-transitory computer-readable media of claim 1, wherein:

the one or more incompatibilities between the un-rendered print job and the particular ad-hoc printing device are caused by one or more print tickets that correspond to the un-rendered print job specifying one or more features and options for processing the un-rendered print job that are not currently supported by the particular ad-hoc printing device, and the one or more non-transitory computer-readable media further store additional instructions which, when processed by the one or more processors, cause resolving the one or more incompatibilities between the un-rendered print job and the particular ad-hoc printing device by:

displaying, via a user interface of the mobile client device, one or more graphical user interface objects that allow a user of the mobile client device to change one or more features and options values specified by the one or more print tickets that correspond to the un-rendered print job.

5. The one or more non-transitory computer-readable media of claim 1, further storing additional instructions which, when processed by the one or more processors, cause:

displaying, via a user interface of the mobile client device, one or more graphical user interface objects that correspond to a plurality of features and options;

receiving, via the user interface of the mobile client device, a user selection of one or more particular features and options for processing the un-rendered print job on the particular ad-hoc printing device; and automatically selecting, by a print driver at the mobile client device, the particular ad-hoc printing device from a plurality of ad-hoc printing devices, based upon a determination that the particular ad-hoc printing device currently supports the one or more particular features and options for processing the un-rendered print job indicated by the user selection.

6. The one or more non-transitory computer-readable media of claim 1, further storing additional instructions which, when processed by the one or more processors, cause:

displaying, via a user interface of the mobile client device, one or more graphical user interface objects that include controls for allowing a user of the mobile client device to perform one or more of i) again submit the un-rendered print job from the mobile client device to the print rendering server for rendering; or ii) request that the print rendering server re-transmit the rendered print job to the particular ad-hoc printing device or the other ad-hoc printing device.

7. An apparatus comprising:
one or more processors; and
one or more memories storing instructions which, when processed by the one or more processors, cause:
prior to an ad-hoc wireless communications link being established between a mobile client device and a particular ad-hoc printing device, at the mobile client device, generating an un-rendered print job; and
after the ad-hoc wireless communications link is established between the mobile client device and the particular ad-hoc printing device:
determining, at the mobile client device, whether the un-rendered print job is compatible with the particular ad-hoc printing device,
in response to determining, at the mobile client device, that the un-rendered print job is compatible with the particular ad-hoc printing device, then causing the un-rendered print job to be transmitted via one or more communications links from the mobile client device to a print rendering server that is separate from the mobile client device for rendering, and
in response to determining, at the mobile client device, that the un-rendered print job is not compatible with the particular ad-hoc printing device, then
generating, at the mobile client device, an updated un-rendered print job by resolving one or more incompatibilities between the un-rendered print job and the particular ad-hoc printing device, and
causing, at the mobile client device, the updated un-rendered print job to be transmitted via the one or more communications links from the mobile client device to the print rendering server that is separate from the mobile client device for rendering
at the mobile client device, after establishing a new ad-hoc wireless communications link with the particular ad-hoc printing device and prior to causing the un-rendered print job to again be transmitted to the print rendering server, determining whether one or more features and options for the un-rendered print job are currently supported by the particular ad-hoc printing device;
at the mobile client device, after establishing an ad-hoc wireless communications link with an other ad-hoc printing device that is different than the particular ad-hoc printing device and prior to causing the un-rendered print job to be transmitted to the print rendering server, determining whether one or more features and options for the un-rendered print job are currently supported by the other ad-hoc printing device;
at the mobile client device, generating an authentication request to request authentication of a user of the mobile client device;
at the mobile client device, transmitting the authentication request via the one or more communications links to an authentication server;
at the mobile client device, receiving an authentication response via the one or more communications links from the authentication server;
determining, at the mobile client device, whether the authentication response indicates that the user of the mobile client device has been successfully authenticated; and wherein causing the un-rendered print job to be transmitted via the one or more communications links from the mobile client device to the print rendering server that is separate from the mobile client device for rendering is performed in response to determining, at the mobile client device, that the user of the mobile client device has been successfully authenticated.

8. The apparatus of claim 7, wherein:
the un-rendered print job includes a print job ticket and an electronic document, and
the one or more memories further store additional instructions which, when processed by the one or more processors, cause:
at the mobile client device, receiving via the one or more communications links from the print rendering server, a rendered print job that is a rendered version of the un-rendered print job and includes printer description language data; and
at the mobile client device, transmitting the rendered print job to the particular ad-hoc printing device.

9. The apparatus of claim 7, wherein the one or more memories store additional instructions which, when processed by the one or more processors, cause:
at the mobile client device, displaying via a user interface of the mobile client device, one or more graphical user interface objects that allow a user of the mobile client device to request an attempt to establish a new ad-hoc wireless communications link with the particular ad-hoc printing device or to request an attempt to establish an ad-hoc wireless communications link with the other ad-hoc wireless communications device.

10. The apparatus of claim 7, wherein:
the one or more incompatibilities between the un-rendered print job and the particular ad-hoc printing device are caused by one or more print tickets that correspond to the un-rendered print job specifying one or more features and options for processing the un-rendered print job that are not currently supported by the particular ad-hoc printing device, and
the one or more memories store additional instructions which, when processed by the one or more processors, cause resolving the one or more incompatibilities between the un-rendered print job and the particular ad-hoc printing device by:
displaying, via a user interface of the mobile client device, one or more graphical user interface objects that allow a user of the mobile client device to change one or more features and options values specified by the one or more print tickets that correspond to the un-rendered print job.

11. The apparatus of claim 7, wherein the one or more memories store additional instructions which, when processed by the one or more processors, cause:
displaying, via a user interface of the mobile client device, one or more graphical user interface objects that correspond to a plurality of features and options;
receiving, via the user interface of the mobile client device, a user selection of one or more particular features and options for processing the un-rendered print job on the particular ad-hoc printing device; and
automatically selecting, by a print driver at the mobile client device, the particular ad-hoc printing device from a plurality of ad-hoc printing devices, based upon a determination that the particular ad-hoc printing device currently supports the one or more particular features and options for processing the un-rendered print job indicated by the user selection.

12. The apparatus of claim 7, wherein the one or more memories store additional instructions which, when processed by the one or more processors, cause:
displaying, via a user interface of the mobile client device, one or more graphical user interface objects that include controls for allowing a user of the mobile client device to perform one or more of i) again submit the un-rendered print job from the mobile client device to the print rendering server for rendering; or ii) request that the print rendering server re-transmit the rendered print job to the particular ad-hoc printing device or the other ad-hoc printing device.

13. A computer-implemented method comprising:
prior to an ad-hoc wireless communications link being established between a mobile client device and a particular ad-hoc printing device, at the mobile client device, generating an un-rendered print job; and
after the ad-hoc wireless communications link is established between the mobile client device and the particular ad-hoc printing device:
determining, at the mobile client device, whether the un-rendered print job is compatible with the particular ad-hoc printing device,
in response to determining, at the mobile client device, that the un-rendered print job is compatible with the particular ad-hoc printing device, then causing the un-rendered print job to be transmitted via one or more communications links from the mobile client device to a print rendering server that is separate from the mobile client device for rendering, and
in response to determining, at the mobile client device, that the un-rendered print job is not compatible with the particular ad-hoc printing device, then
generating, at the mobile client device, an updated un-rendered print job by resolving one or more incompatibilities between the un-rendered print job and the particular ad-hoc printing device, and
causing, at the mobile client device, the updated un-rendered print job to be transmitted via the one or more communications links from the mobile client device to the print rendering server that is separate from the mobile client device for rendering,
at the mobile client device, after establishing a new ad-hoc wireless communications link with the particular ad-hoc printing device and prior to causing the un-rendered print job to again be transmitted to the print rendering server, determining whether one or more features and options for the un-rendered print job are currently supported by the particular ad-hoc printing device;
at the mobile client device, after establishing an ad-hoc wireless communications link with an other ad-hoc printing device that is different than the particular ad-hoc printing device and prior to causing the un-rendered print job to be transmitted to the print rendering server, determining whether one or more features and options for the un-rendered print job are currently supported by the other ad-hoc printing device;
at the mobile client device, generating an authentication request to request authentication of a user of the mobile client device;
at the mobile client device, transmitting the authentication request via the one or more communications links to an authentication server;

at the mobile client device, receiving an authentication response via the one or more communications links from the authentication server;

determining, at the mobile client device, whether the authentication response indicates that the user of the mobile client device has been successfully authenticated; and wherein causing the un-rendered print job to be transmitted via the one or more communications links from the mobile client device to the print rendering server that is separate from the mobile client device for rendering is performed in response to determining, at the mobile client device, that the user of the mobile client device has been successfully authenticated.

14. The computer-implemented method of claim 13, further comprising:

displaying, via a user interface of the mobile client device, one or more graphical user interface objects that include controls for allowing a user of the mobile client device to perform one or more of i) again submit the un-rendered print job from the mobile client device to the print rendering server for rendering; or ii) request that the print rendering server re-transmit the rendered print job to the particular ad-hoc printing device or the other ad-hoc printing device.

15. The one or more non-transitory computer-readable media of claim 1, further storing additional instructions which, when processed by the one or more processors, cause:

detecting, at the mobile client device, that an error on the ad-hoc wireless communications link has prevented a rendered print job that corresponds to the un-rendered print job from being successfully processed at the particular ad-hoc printing device, in response to detecting, at the mobile client device, that an error on the ad-hoc wireless communications link has prevented the rendered print job that corresponds to the un-rendered print job from being successfully processed at the particular ad-hoc printing device, then causing one or more of establishing a new ad-hoc wireless communications link with the particular ad-hoc printing device or establishing an ad-hoc wireless communications link with the other ad-hoc printing device that is different than the particular ad-hoc printing device.

16. The apparatus of claim 7, wherein the one or more memories store additional instructions which, when processed by the one or more processors, cause:

detecting, at the mobile client device, that an error on the ad-hoc wireless communications link has prevented a rendered print job that corresponds to the un-rendered print job from being successfully processed at the particular ad-hoc printing device, in response to detecting, at the mobile client device, that an error on the ad-hoc wireless communications link has prevented the rendered print job that corresponds to the un-rendered print job from being successfully processed at the particular ad-hoc printing device, then causing one or more of establishing a new ad-hoc wireless communications link with the particular ad-hoc printing device or establishing an ad-hoc wireless communications link with the other ad-hoc printing device that is different than the particular ad-hoc printing device.

\* \* \* \* \*